United States Patent
Fairgrieve

(10) Patent No.: US 11,554,778 B2
(45) Date of Patent: Jan. 17, 2023

(54) VEHICLE SPEED CONTROL

(71) Applicant: JAGUAR LAND ROVER LIMITED, Coventry (GB)

(72) Inventor: Andrew Fairgrieve, Warwickshire (GB)

(73) Assignee: JAGUAR LAND ROVER LIMITED, Coventry (GB)

(*) Notice: Subject to any disclaimer, the term of this patent is extended or adjusted under 35 U.S.C. 154(b) by 173 days.

(21) Appl. No.: 16/315,951

(22) PCT Filed: Jul. 6, 2017

(86) PCT No.: PCT/EP2017/066962
§ 371 (c)(1),
(2) Date: Jan. 7, 2019

(87) PCT Pub. No.: WO2018/007535
PCT Pub. Date: Jan. 11, 2018

(65) Prior Publication Data
US 2019/0161082 A1    May 30, 2019

(30) Foreign Application Priority Data
Jul. 8, 2016 (GB) .................................. 1611895

(51) Int. Cl.
*B60W 30/14* (2006.01)
*B60W 50/00* (2006.01)
(Continued)

(52) U.S. Cl.
CPC .......... *B60W 30/143* (2013.01); *B60W 10/06* (2013.01); *B60W 10/10* (2013.01);
(Continued)

(58) Field of Classification Search
CPC .... B60W 30/143; B60W 10/06; B60W 10/10; B60W 10/184; B60W 10/22;
(Continued)

(56) References Cited

U.S. PATENT DOCUMENTS 4,651,290 A    5/1987    Masaki et al.
4,713,764 A   12/1987    Klatt
(Continued)

FOREIGN PATENT DOCUMENTS

DE    3817495 A    11/1989
DE    10242112      4/2004
(Continued)

OTHER PUBLICATIONS

JP-2017211758A English Translation.*
(Continued)

*Primary Examiner* — Rami Khatib
*Assistant Examiner* — Gabriel J Lambert
(74) *Attorney, Agent, or Firm* — McCoy Russell LLP

(57) ABSTRACT

A speed control system (12) for a vehicle (100), the speed control system (12) being configured to: automatically cause application of positive and negative torque, as required, to one or more wheels of a vehicle (100) to cause a vehicle to travel in accordance with a target speed value, the target speed value being stored in a memory of the control system (12); and detect a crest of a slope ahead of the vehicle (100); wherein the speed control system (12) is configured automatically to attempt to adjust a speed of the vehicle (100) to cause the vehicle (100) to travel at a predetermined crest speed value when a crest of a slope is detected ahead of the vehicle (100), the predetermined crest speed value being determined in dependence at least in part on terrain gradient information respect of terrain prior to the crest.

18 Claims, 9 Drawing Sheets

(51) Int. Cl.
  *B60W 10/06* (2006.01)
  *B60W 10/10* (2012.01)
  *B60W 10/184* (2012.01)
  *B60W 10/22* (2006.01)

(52) U.S. Cl.
  CPC .......... *B60W 10/184* (2013.01); *B60W 10/22* (2013.01); *B60W 50/0097* (2013.01); *B60K 2310/244* (2013.01); *B60W 2420/42* (2013.01); *B60W 2552/15* (2020.02); *B60W 2552/20* (2020.02); *B60W 2720/10* (2013.01); *B60W 2720/103* (2013.01)

(58) Field of Classification Search
  CPC ......... B60W 50/0097; B60W 2252/15; B60W 2252/20; B60W 2720/10; B60W 2420/42; B60W 2720/103; B60W 10/20; B60W 30/146; B60K 2310/244; B60T 8/1755
  See application file for complete search history.

(56) References Cited

U.S. PATENT DOCUMENTS

| | | | |
|---|---|---|---|
| 4,829,434 A | 5/1989 | Karmel et al. | |
| 4,922,427 A | 5/1990 | Yakote et al. | |
| 5,487,002 A | 1/1996 | Diller et al. | |
| 5,513,107 A | 4/1996 | Gormley | |
| 5,978,731 A * | 11/1999 | Matsuda | B60T 8/172 701/93 |
| 6,188,945 B1 | 2/2001 | Graf et al. | |
| 6,532,407 B1 | 3/2003 | Fuhrer et al. | |
| 6,591,937 B2 | 7/2003 | Badenoch et al. | |
| 6,654,671 B2 | 11/2003 | Schubert | |
| 2002/0087253 A1* | 7/2002 | Jeon | G06K 9/00798 701/93 |
| 2005/0143895 A1* | 6/2005 | Kato | B60W 30/16 701/96 |
| 2007/0005218 A1* | 1/2007 | Ueyama | B60W 30/16 701/96 |
| 2007/0016351 A1 | 1/2007 | Allen et al. | |
| 2007/0061059 A1 | 3/2007 | Inoue et al. | |
| 2009/0069953 A1 | 3/2009 | Hale et al. | |
| 2009/0240408 A1* | 9/2009 | Wolfgang | B60W 30/16 701/55 |
| 2009/0321165 A1 | 12/2009 | Haug | |
| 2011/0066342 A1 | 3/2011 | Ozaki | |
| 2011/0276216 A1* | 11/2011 | Vaughan | B60W 10/04 701/31.4 |
| 2012/0123651 A1* | 5/2012 | Johansson | B60W 10/10 701/51 |
| 2012/0296539 A1* | 11/2012 | Cooprider | B60W 10/20 701/70 |
| 2012/0323444 A1 | 12/2012 | Rieger et al. | |
| 2014/0074370 A1* | 3/2014 | Johansson | B60K 31/00 701/93 |
| 2015/0314775 A1* | 11/2015 | Dextreit | B60W 20/12 701/22 |
| 2016/0016586 A1* | 1/2016 | Banerjee | B60W 10/06 701/94 |
| 2017/0129492 A1* | 5/2017 | Follen | B60W 30/143 |
| 2018/0022336 A1* | 1/2018 | Morimoto | F02D 41/107 180/65.21 |
| 2019/0241174 A1* | 8/2019 | Ito | B60L 7/14 |

FOREIGN PATENT DOCUMENTS

| | | |
|---|---|---|
| DE | 10200503701 | 12/2006 |
| DE | 102005045891 | 2/2007 |
| DE | 102005041853 | 3/2007 |
| DE | 102006022080 | 11/2007 |
| DE | 102008039950 | 3/2010 |
| DE | 102010038970 | 9/2012 |
| EP | 1028011 A | 8/2000 |
| EP | 1355209 | 10/2003 |
| EP | 2757013 | 7/2014 |
| FR | 2796893 A | 2/2001 |
| FR | 002875461 | 3/2006 |
| FR | 2899190 A1 | 10/2007 |
| GB | 2273580 A | 6/1994 |
| GB | 2353872 A | 3/2001 |
| GB | 2357159 A | 6/2001 |
| GB | 2403027 | 12/2004 |
| GB | 2448385 | 10/2008 |
| GB | 2492748 | 1/2013 |
| GB | 2499461 | 8/2013 |
| JP | H04257759 A | 9/1992 |
| JP | 2009113763 | 5/2009 |
| JP | 2009280098 | 12/2009 |
| JP | 2017211758 A * | 5/2016 ............ Y02T 10/72 |
| WO | 2007070160 | 6/2007 |
| WO | 2007/132213 A1 | 11/2007 |
| WO | 2009066143 A2 | 5/2009 |
| WO | 2010049769 | 5/2010 |
| WO | 2011002367 | 1/2011 |
| WO | 2011126430 | 10/2011 |
| WO | 2013186208 | 12/2013 |

OTHER PUBLICATIONS

Search and Examination Report, GB1611895.2, dated Jan. 5, 2017.
International Search Report and Written Opinion, PCT/EP2017/066962, dated Oct. 19, 2017.

* cited by examiner

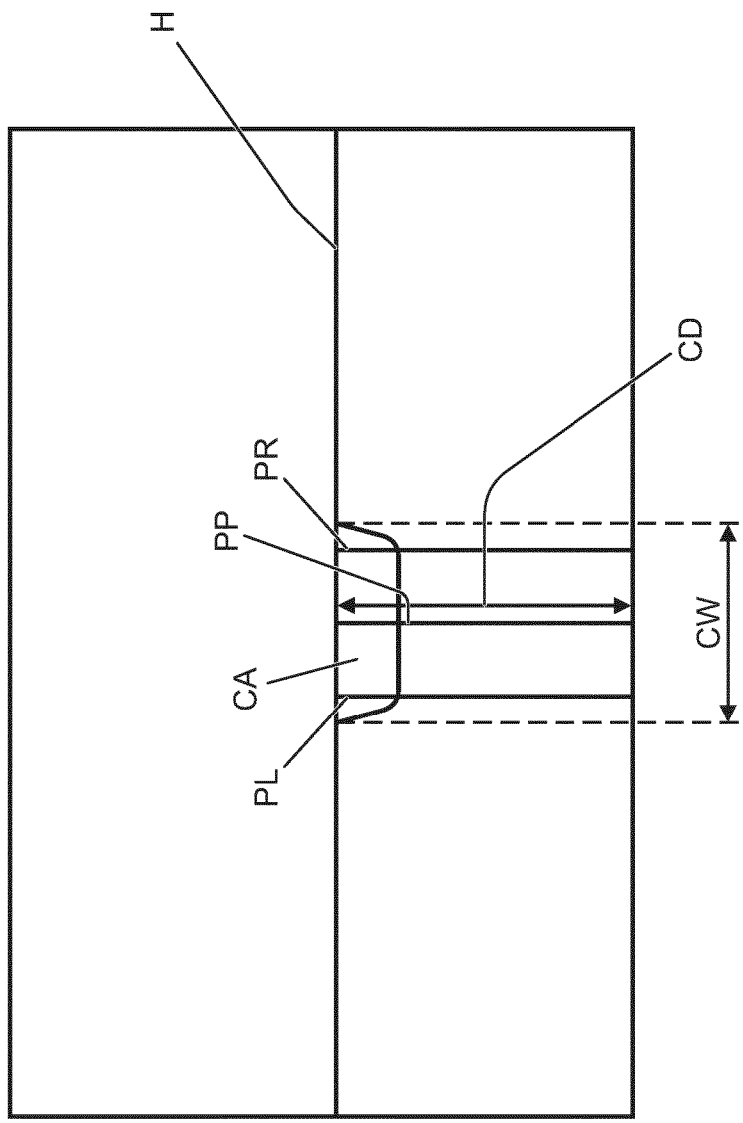

S101 Receive stream of video data from stereoscopic camera system 185C.

S103 Calculate 3D point cloud dataset based on stream of video data.

S105 Transform point cloud dataset to vehicle reference frame X, Y, Z.

S107 Generate elevation map with respect to vehicle frame of reference.

S109 Divide elevation map into cells and group datapoints in each cell into one or more patches.

S111 Identify patches corresponding to objects overhanging the predicted path and ignore for subsequent calculations.

S113 Identify shadow cells and ignore for subsequent calculations.

S115 Calculate predicted path PP and track PL, PR of respective left and right front wheels

S117 Is a crest line is present ahead of the vehicle based on the presence of empty cells in the elevation map in the predicted path ahead of the vehicle?

S119 Is the crest line an uphill crest line? —N→

 Y

S121 Calculate value of control distance; if LSP_set-speed is greater than the uphill crest line maximum speed value, then when the vehicle 100 reaches the control location begin to cause vehicle speed to reduce to the uphill crest line maximum speed such that this speed is reached substantially at the crest line and not before.

Figure 7 (continued on page 9)

S123 Calculate value of control distance; if LSP_set-speed is greater than the downhill crest line maximum speed value, then when the vehicle 100 reaches the control location begin to cause vehicle speed to reduce to the downhill crest line maximum speed such that this speed is reached substantially at the speed location and not before.
FIGURE 7 (continued from page 8)

VEHICLE SPEED CONTROL

CROSS-REFERENCE TO RELATED APPLICATIONS

This application is a 371 of International Application No. PCT/EP2017/066962, filed Jul. 6, 2017, which claims priority to GB Patent Application 1611895.2, filed Jul. 8, 2016, the contents of both of which are incorporated by reference herein in their entirety.

The content of co-pending UK patent applications GB2507622 and GB2499461 are hereby incorporated by reference. The content of U.S. Pat. No. 7,349,776 and co-pending international patent applications WO2013124321 and WO2014/139875 are incorporated herein by reference. The content of UK patent applications GB2492748, GB2492655 and GB2499279 and UK patent GB2508464 are also incorporated herein by reference.

FIELD OF THE INVENTION

The invention relates to a system for controlling the speed of a vehicle. In particular, but not exclusively, the invention relates to a system for controlling the speed of a land-based vehicle which is capable of driving in a variety of different and extreme terrains and conditions.

BACKGROUND

In known vehicle speed control systems, typically referred to as cruise control systems, the vehicle speed is maintained on-road once set by the user without further intervention by the user so as to improve the driving experience for the user by reducing workload. Cruise control speed (or cruise set-speed) is settable by the vehicle driver, typically by pressing a button when the vehicle is at the desired speed. Plus and minus buttons provide for incremental speed variation whilst the cruise control is set.

One the user has selected a speed at which the vehicle is to be maintained, the vehicle is maintained at that speed for as long as the user does not apply a brake or, in the case of a vehicle having a manual transmission, depress a clutch pedal. The cruise control system takes its speed signal from a driveshaft speed sensor or wheel speed sensors. When the brake or a clutch pedal is depressed, the cruise control system is disabled so that the user can override the cruise control system to change the vehicle speed without resistance from the system. When the cruise control system is active, if the user depresses the accelerator pedal a sufficient amount the vehicle speed will increase, but once the user removes his foot from the accelerator pedal the vehicle reverts to the pre-set cruise speed by coasting.

Such systems are usually operable only above a certain speed, typically around 15-20 kph, and are ideal in circumstances in which the vehicle is travelling in steady traffic conditions, and particularly on highways or motorways. In congested traffic conditions, however, where vehicle speed tends to vary widely, cruise control systems are ineffective, and especially where the systems are inoperable because of a minimum speed requirement. A minimum speed requirement is often imposed on cruise control systems so as to reduce the likelihood of low speed collision, for example when parking. Such systems are therefore ineffective in certain driving conditions (e.g. low speed) and are set to be automatically disabled in circumstances in which a user may not consider it to be desirable to do so.

More sophisticated cruise control systems are integrated into the engine management system and may include an adaptive functionality which takes into account the distance to the vehicle in front using a radar-based system. For example, the vehicle may be provided with a forward-looking radar detection system so that the speed and distance of the vehicle in front is detected and a safe following speed and distance is maintained automatically without the need for user input. If the lead vehicle slows down, or another object is detected by the radar detection system, the system sends a signal to the engine or the braking system to slow the vehicle down accordingly, to maintain a safe following distance.

Known cruise control systems also cancel in the event that a wheel slip event is detected requiring intervention by a traction control system (TCS) or stability control system (SCS). Accordingly, they are not well suited to maintaining vehicle progress when driving in off road conditions where such events may be relatively common.

Some vehicles are adapted for off-highway use, and low-speed cruise control systems for such vehicles have been developed. In off-highway conditions low-speed cruise control systems permit a driver, particularly a novice driver, to concentrate upon activities such as steering.

Low-speed cruise control systems suitable for off-road use may be configured to cause a vehicle to travel at a speed that is below the user-determined set-speed in dependence on the roughness of the terrain over which the vehicle is travelling. Nevertheless the present applicant has recognised that there are circumstances other than driving over rough terrain in which a reduced vehicle speed would be helpful to a user endeavouring to negotiate the terrain.

It is also known to provide a control system for a motor vehicle for controlling one or more vehicle subsystems. U.S. Pat. No. 7,349,776 discloses a vehicle control system comprising a plurality of subsystem controllers including an engine management system, a transmission controller, a steering controller, a brakes controller and a suspension controller. The subsystem controllers are each operable in a plurality of subsystem function or configuration modes.

The subsystem controllers are connected to a vehicle mode controller which controls the subsystem controllers to assume a required function mode so as to provide a number of driving modes for the vehicle. Each of the driving modes corresponds to a particular driving condition or set of driving conditions, and in each mode each of the subsystems is set to the function mode most appropriate to those conditions. Such conditions are linked to types of terrain over which the vehicle may be driven such as grass/gravel/snow, mud and ruts, rock crawl, sand and a highway mode known as 'special programs off' (SPO). The vehicle mode controller may be referred to as a Terrain Response® (TR) System or controller. The driving modes may also be referred to as terrain modes, terrain response modes, or control modes.

GB2492655B discloses a control system for a motor vehicle in which the most appropriate terrain mode for the prevailing terrain over which the vehicle is driving is determined automatically by the control system. The control system then causes the vehicle to operate in the terrain mode determined to be the most appropriate.

It is against this background that the present invention has been conceived. Embodiments of the invention may provide an apparatus, a method or a vehicle which addresses the above problems. Other aims and advantages of the invention will become apparent from the following description, claims and drawings.

SUMMARY OF THE INVENTION

In one aspect of the invention for which protection is sought there is provided a speed control system for a vehicle, the speed control system being configured to:
automatically cause application of positive and negative torque, as required, to one or more wheels of a vehicle to cause a vehicle to travel in accordance with a target speed value, the target speed value being stored in a memory of the control system; and
detect a crest of a slope ahead of the vehicle;
wherein the speed control system is configured automatically to attempt to adjust a speed of the vehicle to cause the vehicle to travel at a predetermined crest speed value when a crest of a slope is detected ahead of the vehicle, the predetermined crest speed value being determined in dependence at least in part on terrain gradient information in respect of terrain prior to the crest.

Adjusting a speed of the vehicle may preferably comprise reducing the speed of the vehicle to a speed below the target speed value store in the memory of the vehicle.

Embodiments of the invention have the advantage that the control system may adjust the speed of travel of the vehicle when approaching a crest of a slope in order to enhance vehicle composure and increase driver confidence during a given driving experience.

It is to be understood that in some embodiments where one or more cameras are used to detect the crest of a slope ahead of the vehicle, the location of the crest may be defined as the furthest visible location of the driving surface in a given camera image extending from the instant location of the vehicle before a discontinuity in the driving surface due to the crest occurs, where a crest has been determined to be present. It will be understood that the location of the crest typically changes as a vehicle approaches and negotiates a crest, since the camera will have a greater view over the crest as the vehicle approaches, dependent on the steepness of the crest and the height at which the camera is mounted on the vehicle above the driving surface.

Optionally, the terrain gradient information comprises information indicative of the gradient of the driving surface substantially at the instant location of the vehicle.

It is to be understood that information indicative of the gradient of the driving surface substantially at the instant location of the vehicle may be obtained by means of an inertial measurement unit (IMU) or any other suitable device or system.

Optionally, the terrain gradient information comprises information indicative of the gradient of the driving surface ahead of the instant location of the vehicle.

It is to be understood that information indicative of the gradient of the driving surface ahead of the instant location of the vehicle may be obtained by means of one or more forward-looking sensors such as a video camera arrangement, a radar sensor arrangement or any other suitable means.

Optionally, the terrain gradient information comprises information indicative of the gradient of the driving surface over a prescribed distance prior to the crest.

The control system may receive a signal indicative of the terrain gradient information, or alternatively the control system may comprise a means, for example a camera or IMU as described above, for determining the terrain gradient information.

Optionally, if the gradient information indicates the driving surface over the prescribed distance prior to the crest is inclined above a substantially horizontal plane by more than a first predetermined amount the predetermined crest speed value is set to a first crest speed value.

Optionally, if the gradient information indicates the driving surface is not inclined above a substantially horizontal plane by more than the first predetermined amount the predetermined crest speed value is set to a second crest speed value different from the first.

Optionally, the first crest speed value is greater than the second crest speed value.

The feature that the control system favours a higher crest speed value when the vehicle is travelling uphill to a crest has the feature that the vehicle will have more momentum when travelling uphill, increasing the likelihood that the vehicle will make adequate progress up the hill and successfully negotiate the crest ahead of the vehicle. In contrast, a lower speed may be enjoyed when a crest is encountered whilst travelling over a driving surface that is not upwardly inclined by more than the predetermined amount, such as a substantially horizontal driving surface or downhill driving surface.

In some embodiments, the LSP control system 12 may cause the second crest speed value to be assumed substantially only if the driving surface is within a predetermined angular range above and below a substantially horizontal plane.

Optionally, the control system may be configured to control a speed of the vehicle to target the predetermined crest speed value at a predetermined speed location with respect to the crest of the slope.

Optionally, the predetermined speed location is determined at least in part in dependence on the gradient information in respect of terrain prior to the crest.

Optionally, the control system is configured wherein if the gradient information indicates the driving surface is not inclined above a substantially horizontal plane by more than the first predetermined amount the predetermined speed location is a first, non-zero, speed distance ahead of the crest.

Thus, in the case that the gradient information indicates the driving surface is not inclined above a substantially horizontal plane by more than the first predetermined amount, the control system causes vehicle speed not to exceed the second crest speed value when the vehicle is at the predetermined speed location. The predetermined speed location may be any suitable distance such as 1 m, 5 m, 10 m or any other suitable distance ahead of the crest.

Optionally the control system may be configured wherein if the gradient information indicates the driving surface is inclined above a substantially horizontal plane by more than the first predetermined amount the predetermined speed location is set to be a second speed distance from the crest.

Thus, in the case that the gradient information indicates the driving surface is inclined above a substantially horizontal plane by more than the first predetermined amount, the control system causes vehicle speed not to exceed the second crest speed value when the vehicle is at the predetermined location, which is a second speed distance from the crest.

Optionally, the second speed distance is substantially zero.

Thus, the second speed distance is set to be substantially at the crest. Accordingly, where the vehicle is ascending a slope at a speed greater than the second crest speed value, the control system causes speed to reduce such that the speed falls to the second crest speed value substantially at the crest and not before it.

Optionally, if the gradient information indicates the driving surface is inclined above a substantially horizontal plane by more than the first predetermined amount the second speed distance is set to a second distance beyond the crest.

Optionally, the control system may be configured to cause vehicle speed to begin to reduce to the predetermined crest speed value when the vehicle is at a predetermined control location, the predetermined control location being a predetermined control distance ahead of the predetermined speed location.

Optionally, the predetermined control distance is calculated as the distance travelled by the vehicle at the instant target speed value in a predetermined time period.

In some embodiments the predetermined time period may be 3 s. Other values may be useful in some embodiments.

In some embodiments, the predetermined control distance may be calculated on the basis of (a) an understanding of the distance ahead of the vehicle at which a crest may be detected, for example by a stereoscopic camera system, (b) the maximum speed at which the vehicle may travel under the control of the speed control system, (c) the maximum rate of deceleration of the vehicle under the control of the speed control system, and (d) the crest speed value. In some embodiments having a stereoscopic camera system, it is found empirically that a crest may be reliably detected a distance of 25 m ahead of the vehicle. In some embodiments the maximum speed of the vehicle under the control of the speed control system is around 30 km/h (8 m/s), the maximum rate of deceleration under the control of the speed control system is around 1.5 m/s2, and the crest speed value is around 3.6 km/h (1.0 m/s). Accordingly, the distance required to decelerate the vehicle from 8 m/s to 1.0 m/s at a rate of deceleration of 1.5 m/s2 may be determined.

In some embodiments, the control system may determine the predetermined control distance (in m) to be numerically equal to substantially three times the speed of the vehicle (in m/s) at the moment deceleration is commenced. Other arrangements may be useful in some embodiments.

Optionally, the predetermined control distance is calculated in dependence at least in part on the gradient information in respect of terrain prior to the crest.

Optionally, the predetermined control distance is arranged to decrease with increasing gradient of the terrain prior to the crest based on the gradient information.

It is to be understood that lower values of control distance may be acceptable when travelling up increasingly steep gradients due to the assistance of gravity in arresting vehicle travel.

Optionally, the predetermined control distance is arranged to increase with increasing downhill gradient of the terrain prior to the crest, based on the gradient information.

Conversely, it is to be understood that higher values of control distance may be preferable when travelling down increasingly steep gradients due to the action of gravity in countering braking.

Optionally, the predetermined control distance is determined in further dependence at least in part on the identity of a selected one of a plurality of driving modes in which the vehicle is operating.

The driving modes may also be referred to as terrain modes, or 'terrain response' modes.

Optionally, in each driving mode at least one of a plurality of vehicle subsystems is caused to operate in a predetermined one of a plurality of configuration modes of that subsystem, the subsystem configuration mode being determined in dependence on the selected driving mode.

Optionally, the subsystems include at least one of a powertrain subsystem, a brakes subsystem and a suspension subsystem.

Optionally, the driving modes include at least one mode adapted for driving over high drag surfaces, wherein the predetermined control distance is arranged to be lower for control modes adapted for operation on high drag surfaces relative to control modes adapted for operation on low drag surfaces, for a given driving surface topography.

Thus, for a given topography of terrain ahead of the vehicle, the predetermined control distance may be lower for control modes adapted for high drag surfaces such as a sand mode, where the terrain assists in arresting vehicle speed, relative to a control mode adapted for relatively low drag surfaces such as hard, dry asphalt or dirt tracks.

Optionally, the system comprises:
an electronic processor having an electrical input for receiving a signal providing information indicative of a target speed and a signal providing information indicative of terrain gradient; and
an electronic memory device electrically coupled to the electronic processor and having instructions stored therein,
wherein the processor is configured to access the memory device and execute the instructions stored therein such that it is operable to:
cause application of positive and negative torque to one or more wheels of a vehicle to cause a vehicle to travel in accordance with a target speed value, and adjust automatically a speed of the vehicle to a predetermined crest speed value when a crest of a slope is detected ahead of the vehicle, the predetermined crest speed value being determined in dependence at least in part on terrain gradient information in respect of terrain prior to the crest.

It is to be understood that application of positive and negative torque to one or more wheels may be caused to occur by means of a powertrain controller and a brake controller, respectively.

In a further aspect of the invention for which protection is sought there is provided a vehicle comprising a control system according to another aspect.

In another aspect of the invention for which protection is sought there is provided an electronic controller, the controller comprising:
one or more electrical input for receiving a signal providing information indicative of a target speed value; a signal indicative that a crest of a slope is detected ahead of the vehicle; and a signal providing information indicative of terrain gradient in respect of terrain prior to the crest
wherein the controller causes application of positive and/or negative torque to one or more wheels of a vehicle to:
cause a vehicle to travel in accordance with the target speed value; and to
adjust automatically a speed of the vehicle to a predetermined crest speed value when a crest of a slope is detected ahead of the vehicle, wherein the predetermined crest speed value is determined in dependence at least in part on signal indicative of terrain gradient information in respect of terrain prior to the crest.

The control system may be configured to cause vehicle speed to begin to reduce to the predetermined crest speed value when the vehicle is at a control location, the control location being a distance ahead of the predetermined speed location which is dependent on an amount of rolling resistance experienced by the vehicle. The rolling resistance in this case is an amount of drag caused by the road surface upon which the vehicle is driving. Where the rolling resistance (drag) is relatively high, the control location may be a relatively short distance ahead of the predetermined speed location, whereas where the rolling resistance is relatively low, the control location may be a relatively long distance ahead of the predetermined speed location.

In another aspect of the invention for which protection is sought there is provided a method of controlling the speed of a vehicle implemented by means of a control system, comprising:
automatically causing application of positive and negative torque, as required, to one or more wheels of a vehicle to cause a vehicle to travel in accordance with a target speed value, the target speed value being stored in a memory of the control system; and
detecting a crest of a slope ahead of the vehicle; and
automatically attempting to adjust a speed of the vehicle to cause the vehicle to travel at a predetermined crest speed value when a crest of a slope is detected ahead of the vehicle, the method comprising determining the predetermined crest speed value in dependence at least in part on terrain gradient information in respect of terrain prior to the crest.

In an aspect of the invention for which protection is sought there is provided a non-transitory carrier medium carrying a computer readable code for controlling a vehicle to carry out the method of another aspect.

In an aspect of the invention for which protection is sought there is provided a computer program product executable on a processor so as to implement the method of another aspect.

In an aspect of the invention for which protection is sought there is provided a non-transitory computer readable medium loaded with the computer program product of another aspect.

In an aspect of the invention for which protection is sought there is provided a processor arranged to implement the method of another aspect, or the computer program product of another aspect.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF DRAWINGS

The present invention will now be described, by way of example only, with reference to the accompanying drawings, in which:

FIG. 7 is a flow chart illustrating operation of a vehicle according to the embodiment of FIG. 1.

DETAILED DESCRIPTION

References herein to a block such as a function block are to be understood to include reference to software code for performing the function or action specified which may be an output that is provided responsive to one or more inputs. The code may be in the form of a software routine or function called by a main computer program, or may be code forming part of a flow of code not being a separate routine or function. Reference to function block is made for ease of explanation of the manner of operation of embodiments of the present invention.

Figure 1:
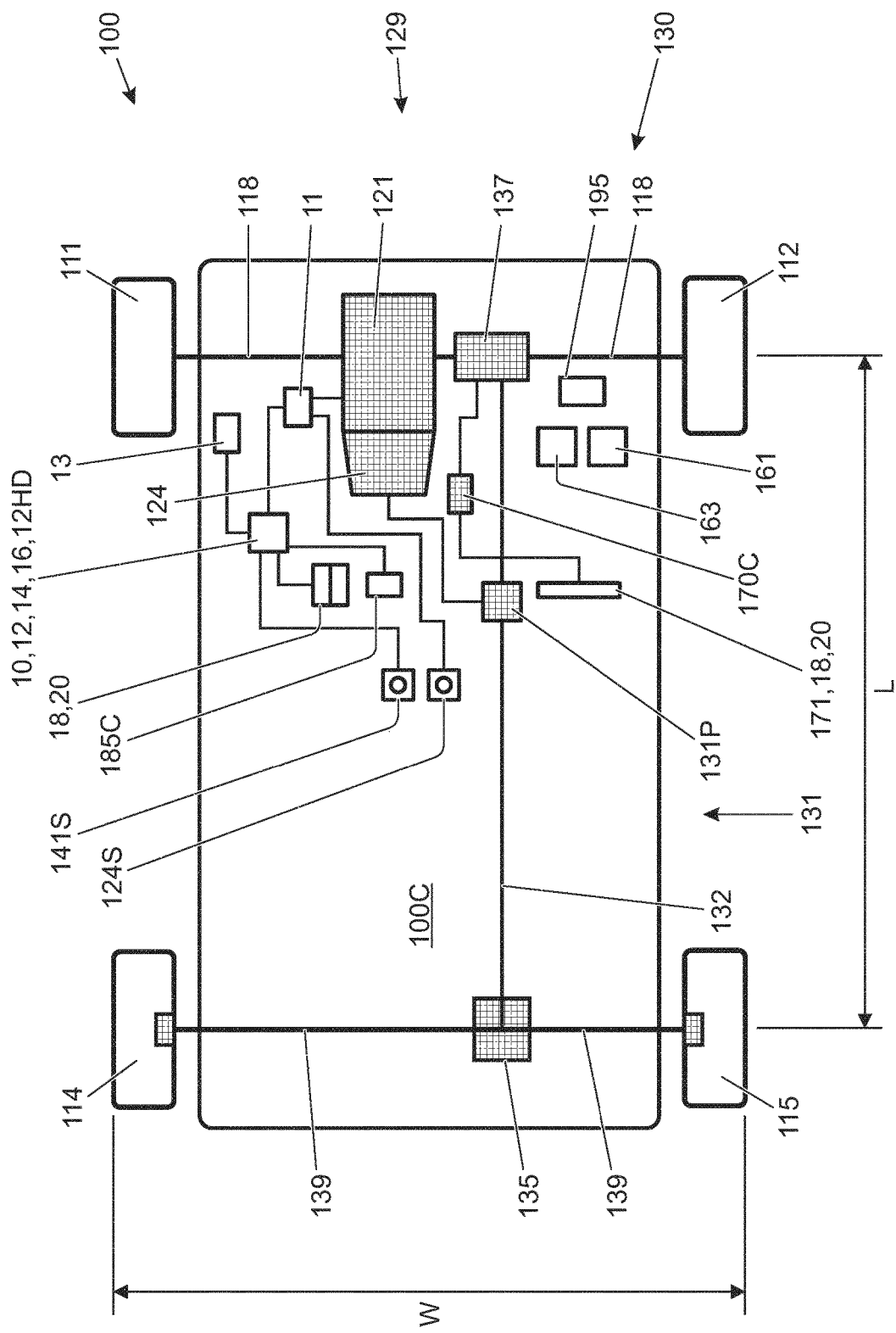
FIG. 1 is a schematic illustration of a vehicle according to an embodiment of the invention in plan view.
Figure 2:
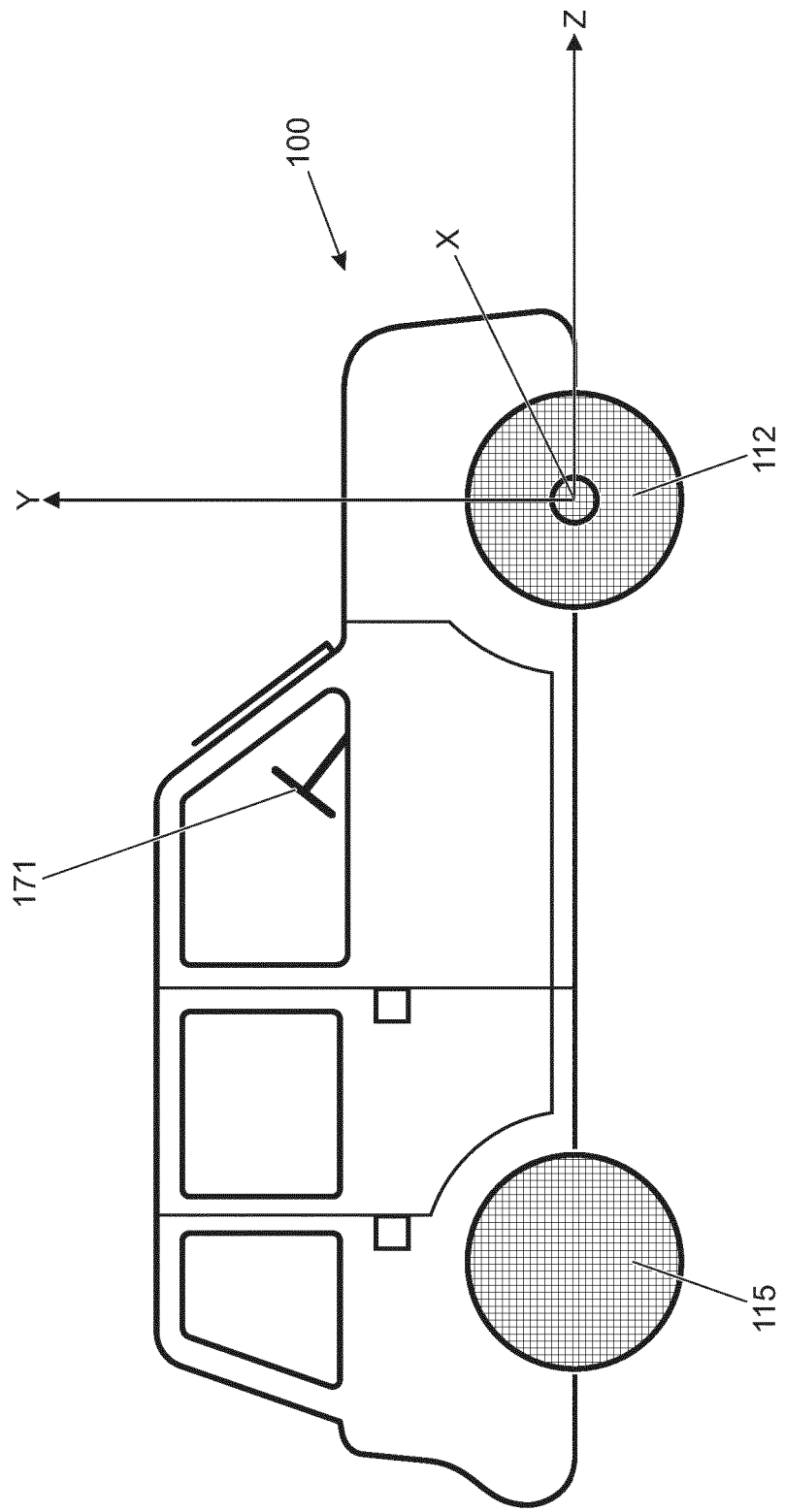
FIG. 2 shows the vehicle of FIG. 1 in side view.

FIG. 1 shows a vehicle 100 according to an embodiment of the present invention. The vehicle 100 has a powertrain 129 that includes an engine 121 that is connected to a driveline 130 having an automatic transmission 124. It is to be understood that embodiments of the present invention are also suitable for use in vehicles with manual transmissions, continuously variable transmissions or any other suitable transmission.

In the embodiment of FIG. 1 the transmission 124 may be set to one of a plurality of transmission operating modes, being a park mode, a reverse mode, a neutral mode, a drive mode or a sport mode, by means of a transmission mode selector dial 124S. The selector dial 124S provides an output signal to a powertrain controller 11 in response to which the powertrain controller 11 causes the transmission 124 to operate in accordance with the selected transmission mode.

The driveline 130 is arranged to drive a pair of front vehicle wheels 111,112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139.

Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 131P, allowing operation in a two wheel drive mode or a four wheel drive mode. It is to be understood that embodiments of the invention may be suitable for vehicles having more than four wheels or where only two wheels are driven, for example two wheels of a three wheeled vehicle or four wheeled vehicle or a vehicle with more than four wheels.

Figure 3:
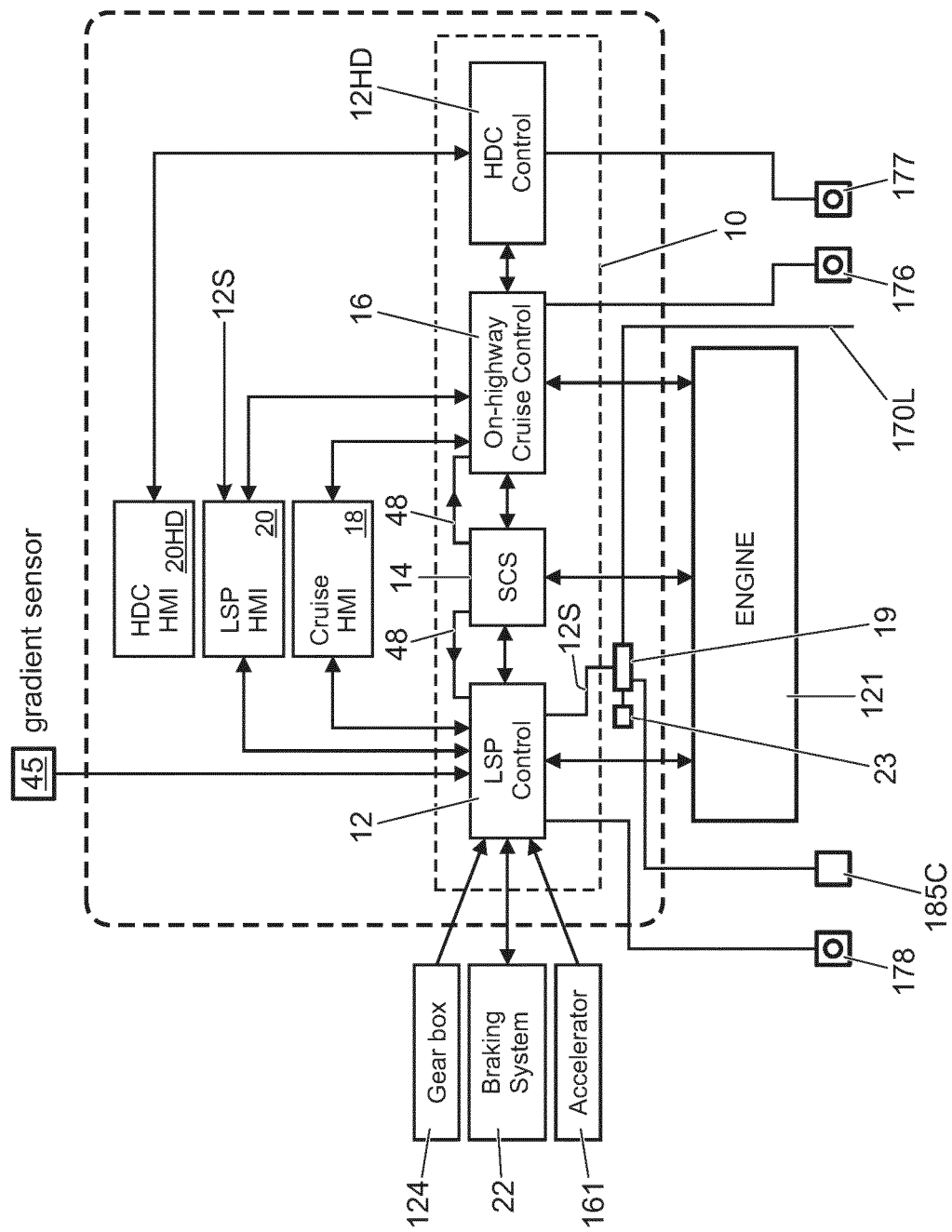
FIG. 3 is a high level schematic diagram of an embodiment of the vehicle speed control system of the present invention, including a cruise control system and a low-speed progress control system.

A control system for the vehicle engine 121 includes a central controller 10, referred to as a vehicle control unit (VCU) 10, the powertrain controller 11, a brake controller 13 (an anti-lock braking system (ABS) controller) and a steering controller 170C. The ABS controller 13 forms part of a braking system 22 (FIG. 3). The VCU 10 receives and outputs a plurality of signals to and from various sensors and subsystems (not shown) provided on the vehicle. The VCU 10 includes a low-speed progress (LSP) control system 12 shown in FIG. 3, a stability control system (SCS) 14, a cruise control system 16 and a hill descent control (HDC) system 12HD. The SCS 14 improves the safety of the vehicle 100 by detecting and managing loss of traction or steering control. When a reduction in traction or steering control is detected, the SCS 14 is operable automatically to command the ABS controller 13 to apply one or more brakes of the vehicle to help to steer the vehicle 100 in the direction the user wishes to travel. In the embodiment shown the SCS 14 is implemented by the VCU 10. In some alternative embodiments the SCS 14 may be implemented by the ABS controller 13.

Although not shown in detail in FIG. 3, the VCU 10 further includes a Traction Control (TC) function block. The TC function block is implemented in software code run by a computing device of the VCU 10. The ABS controller 13 and TC function block provide outputs indicative of, for example, TC activity, ABS activity, brake interventions on individual wheels and engine torque requests from the VCU 10 to the engine 121 in the event a wheel slip event occurs. Each of the aforementioned events indicate that a wheel slip event has occurred. In some embodiments the ABS controller 13 implements the TC function block. Other vehicle sub-systems such as a roll stability control system or the like may also be included.

Figure 4:
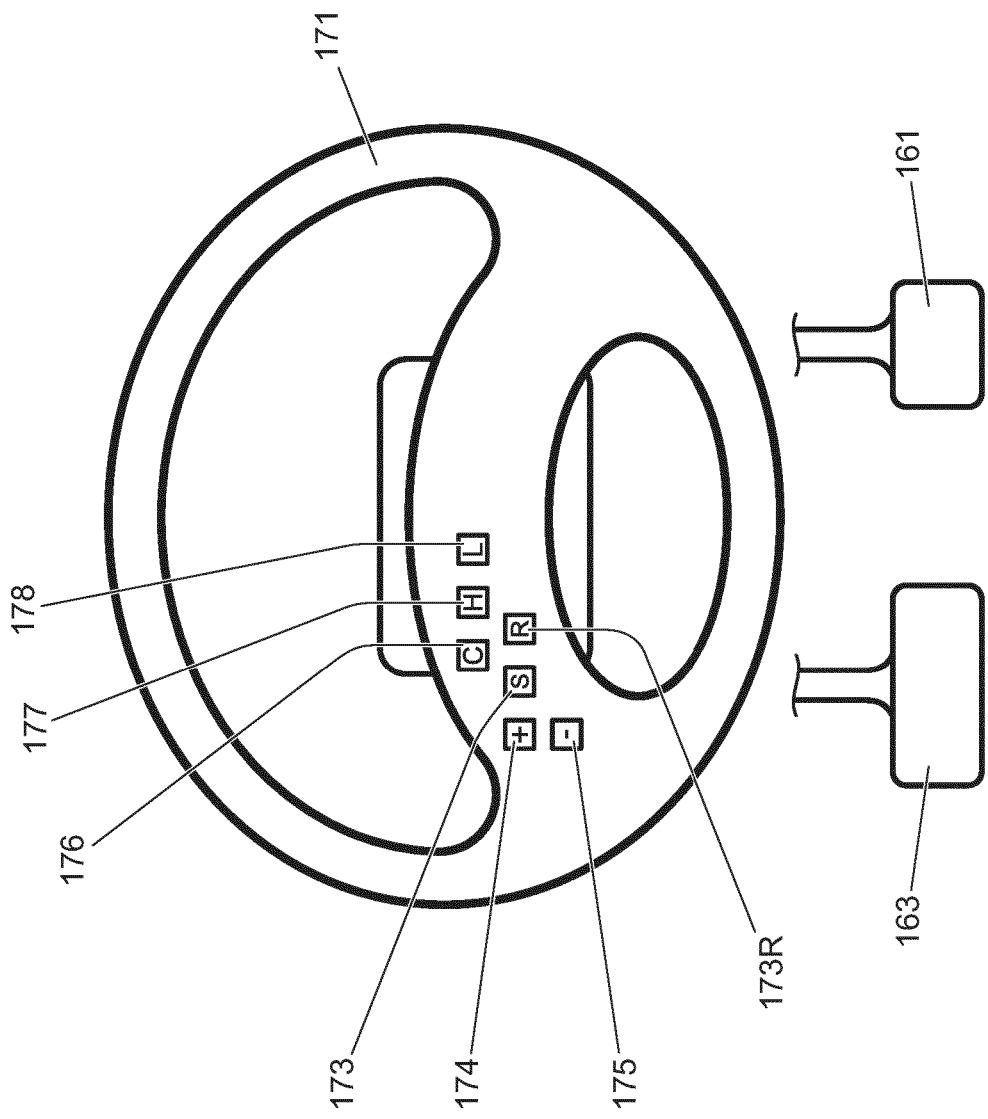
FIG. 4 illustrates a steering wheel of a vehicle according to the embodiment of FIG. 1.

As noted above the vehicle 100 also includes a cruise control system 16 which is operable to automatically maintain vehicle speed at a selected speed when the vehicle is travelling at speeds in excess of 25 kph. The cruise control system 16 is provided with a cruise control HMI (human machine interface) 18 by which means the user can input a target vehicle speed to the cruise control system 16 in a known manner. In one embodiment of the invention, cruise control system input controls are mounted to a steering wheel 171 (FIG. 4). The cruise control system 16 may be switched on by pressing a cruise control system selector button 176. When the cruise control system 16 is switched on, depression of a 'set-speed' control 173 sets the current value of a cruise control set-speed parameter, cruise_set-speed to the current vehicle speed. Depression of a '+' button 174 allows the value of cruise_set-speed to be increased whilst depression of a '−' button 175 allows the value of cruise_set-speed to be decreased. A resume button 173R is provided that is operable to control the cruise control system 16 to resume speed control at the instant value of cruise_set-speed following driver over-ride. It is to be understood that known on-highway cruise control systems including the present system 16 are configured so that, in the event that the user depresses the brake or, in the case of vehicles with a manual transmission, a clutch pedal, control of vehicle speed by the cruise control system 16 is cancelled and the vehicle 100 reverts to a manual mode of operation which requires accelerator or brake pedal input by a user in order to maintain vehicle speed. In addition, detection of a wheel slip event, as may be initiated by a loss of traction, also has the effect of cancelling control of vehicle speed by the cruise control system 16. The user input target speed is stored in a memory of the speed control system and speed control by the system 16 is resumed if the driver subsequently depresses the resume button 173R. The memory is accessed by a processor associated with the LSP control system 12 which executes instructions stored in the memory in order to accomplish speed control. The cruise control system 16 and HDC system 12HD are implemented in a corresponding manner.

The cruise control system 16 monitors vehicle speed and any deviation from the target vehicle speed is adjusted automatically so that the vehicle speed is maintained at a substantially constant value, typically in excess of 25 kph. In other words, the cruise control system is ineffective at speeds lower than 25 kph. The cruise control HMI 18 may also be configured to provide an alert to the user about the status of the cruise control system 16 via a visual display of the HMI 18. In the present embodiment the cruise control system 16 is configured to allow the value of cruise_set-speed to be set to any value in the range 25-150 kph.

The LSP control system 12 also provides a speed-based control system for the user which enables the user to select a very low target speed at which the vehicle can progress without any pedal inputs being required by the user to maintain vehicle speed. Low-speed speed control (or progress control) functionality is not provided by the on-highway cruise control system 16 which operates only at speeds above 25 kph.

In the present embodiment, the LSP control system 12 is activated by pressing LSP control system selector button 178 mounted on steering wheel 171. The system 12 is operable to apply selective powertrain, traction control and braking actions to one or more wheels of the vehicle 100, collectively or individually.

The LSP control system 12 is configured to allow a user to input a desired value of vehicle target speed in the form of a set-speed parameter, user_set-speed, via a low-speed progress control HMI (LSP HMI) 20 (FIG. 1, FIG. 3) which shares certain input buttons 173-175 with the cruise control system 16 and HDC control system 12HD. Provided the vehicle speed is within the allowable range of operation of the LSP control system 12 (which is the range from 2 to 30 kph in the present embodiment although other ranges are also useful) and no other constraint on vehicle speed exists whilst under the control of the LSP control system 12, the LSP control system 12 controls vehicle speed in accordance with a LSP control system set-speed value LSP_set-speed which is stored in a memory of the system 12 and is typically set substantially equal to user_set-speed. Unlike the cruise control system 16, the LSP control system 12 is configured to operate independently of the occurrence of a traction event. That is, the LSP control system 12 does not cancel speed control upon detection of wheel slip. Rather, the LSP control system 12 actively manages vehicle behaviour when slip is detected.

The LSP control HMI 20 is provided in the vehicle cabin so as to be readily accessible to the user. The user of the vehicle 100 is able to input to the LSP control system 12, via the LSP HMI 20, the desired value of user_set-speed as noted above by means of the 'set-speed' button 173 and the '+'/'−' buttons 174, 175 in a similar manner to the cruise control system 16. The LSP HMI 20 also includes a visual display by means of which information and guidance can be provided to the user about the status of the LSP control system 12.

The LSP control system 12 receives an input from the ABS controller 13 of the braking system 22 of the vehicle indicative of the extent to which the user has applied braking by means of the brake pedal 163. The LSP control system 12 also receives an input from an accelerator pedal 161 indicative of the extent to which the user has depressed the accelerator pedal 161, and an input from the transmission or gearbox 124. This latter input may include signals representative of, for example, the speed of an output shaft of the gearbox 124, an amount of torque converter slip and a gear ratio request. Other inputs to the LSP control system 12 include an input from the cruise control HMI 18 which is representative of the status (ON/OFF) of the cruise control system 16, an input from the LSP control HMI 20, and an input from a gradient sensor 45 indicative of the gradient of the driving surface over which the vehicle 100 is driving. In the present embodiment the gradient sensor 45 is a gyroscopic sensor. In some alternative embodiments the LSP control system 12 receives a signal indicative of driving surface gradient from another controller such as the ABS controller 13. The ABS controller 13 may determine gradient based on a plurality of inputs, optionally based at least in part on signals indicative of vehicle longitudinal and lateral acceleration and a signal indicative of vehicle reference speed (v_actual) being a signal indicative of actual vehicle speed over ground. Methods for the calculation of vehicle reference speed based for example on vehicle wheel speeds are well known. For example in some known vehicles the vehicle reference speed may be determined to be the speed of the second slowest turning wheel, or the average speed of all the wheels. Other ways of calculating vehicle reference speed may be useful in some embodiments, including by means of a camera device or radar sensor.

The HDC system 12HD is activated by depressing button 177 comprised by HDC system HMI 20HD and mounted on the steering wheel 171. When the HDC system 12HD is active, the system 12HD controls the braking system 22 in order to limit vehicle speed to a value corresponding to that of a HDC set-speed parameter HDC_set-speed which may be controlled by a user in a similar manner to the set-speed of the cruise control system 16 and LSP control system, using the same control buttons 173, 173R, 174, 175. The HDC system 12HD is operable to allow the value of HDC_set-speed to be set to any value in the range from 2-30 kph. The HDC set-speed parameter may also be referred to as an HDC target speed. Provided the user does not override the HDC system 12HD by depressing the accelerator pedal 161 when the HDC system 12HD is active, the HDC system 12HD controls the braking system 22 (FIG. 3) to prevent vehicle speed from exceeding HDC_set-speed. In the present embodiment the HDC system 12HD is not operable to apply positive drive torque. Rather, the HDC system 12HD is only operable to cause negative brake torque to be applied, via the braking system 22.

It is to be understood that the VCU 10 is configured to implement a known Terrain Response® (TR) System of the kind described above in which the VCU 10 controls settings of one or more vehicle systems or sub-systems such as the powertrain controller 11 in dependence on a selected driving mode. The driving mode may be selected by a user by means of a driving mode selector 141S (FIG. 1). The driving modes may also be referred to as terrain modes, terrain response (TR) modes, or control modes.

In the embodiment of FIG. 1 four driving modes are provided: an 'on-highway' driving mode suitable for driving on a relatively hard, smooth driving surface where a relatively high surface coefficient of friction exists between the driving surface and wheels of the vehicle; a 'sand' driving mode suitable for driving over sandy terrain, being terrain characterised at least in part by relatively high drag, relatively high deformability or compliance and relatively low surface coefficient of friction; a 'grass, gravel or snow' (GGS) driving mode suitable for driving over grass, gravel or snow, being relatively slippery surfaces (i.e. having a relatively low coefficient of friction between surface and wheel and, typically, lower drag than sand); a 'rock crawl' (RC) driving mode suitable for driving slowly over a rocky surface; and a 'mud and ruts' (MR) driving mode suitable for driving in muddy, rutted terrain. Other driving modes may be provided in addition or instead. In the present embodiment the selector 141S also allows a user to select an 'automatic driving mode selection condition' of operation in which the VCU 10 selects automatically the most appropriate driving mode as described in more detail below. The on-highway driving mode may be referred to as a 'special programs off' (SPO) mode in some embodiments since it corresponds to a standard or default driving mode, and is not required to take account of special factors such as relatively low surface coefficient of friction, or surfaces of high roughness.

In order to prevent or at least reduce passenger discomfort due to rapid changes in acceleration rate (jerk) when the LSP control system 12 is controlling vehicle speed, the LSP control system 12 limits the rate of change of acceleration of the vehicle 100 such that it does not exceed a prescribed maximum value. The maximum allowable rate of change of acceleration or maximum allowable jerk value is provided by parameter LSP_J_MAX. The LSP control system 12 also limits the maximum value of rate of acceleration to a value LSP_A_MAX.

The values of LSP_A_MAX and LSP_J_MAX are set in dependence at least in part on TR mode and vehicle speed. In some embodiments, including the present embodiment, the values for TR_mode=sand are higher than the corresponding values for TR_mode=SPO, GGS or MR due to the higher drag imposed on a vehicle 100 traversing sand compared with a vehicle traversing a dry asphalt highway surface, a grass, gravel or snow surface, or a muddy or rutted surface.

The LSP control system 12 causes the vehicle 100 to operate in accordance with the value of LSP_set-speed stored in memory.

In order to cause application of the necessary positive or negative torque to the wheels, the VCU 10 may command that positive or negative torque is applied to the vehicle wheels by the powertrain 129 and/or that a braking force is applied to the vehicle wheels by the braking system 22, either or both of which may be used to implement the change in torque that is necessary to attain and maintain a required vehicle speed. In some embodiments torque is applied to the vehicle wheels individually, for example by powertrain torque vectoring, so as to maintain the vehicle at the required speed. Alternatively, in some embodiments torque may be applied to the wheels collectively to maintain the required speed, for example in vehicles having drivelines where torque vectoring is not possible. In some embodiments, the powertrain controller 11 may be operable to implement torque vectoring to control an amount of torque applied to one or more wheels by controlling a driveline component such as a rear drive unit, front drive unit, differential or any other suitable component. For example, one or more components of the driveline 130 may include one or more clutches operable to allow an amount of torque applied to one or more wheels to be varied. Other arrangements may also be useful.

Where a powertrain 129 includes one or more electric machines, for example one or more propulsion motors and/or generators, the powertrain controller 11 may be operable to modulate torque applied to one or more wheels in order to implement torque vectoring by means of one or more electric machines.

In some embodiments the LSP control system 12 may receive a signal wheel_slip (also labelled 48 in FIG. 3) indicative of a wheel slip event having occurred. This signal 48 is also supplied to the on-highway cruise control system 16 of the vehicle, and which in the case of the latter triggers an override or inhibit mode of operation in the on-highway cruise control system 16 so that automatic control of vehicle speed by the on-highway cruise control system 16 is suspended or cancelled. However, the LSP control system 12 is not arranged to cancel or suspend operation on receipt of wheel_slip signal 48. Rather, the system 12 is arranged to monitor and subsequently manage wheel slip so as to reduce driver workload. During a slip event, the LSP control system 12 continues to compare the measured vehicle speed with the value of LSP_set-speed, and continues to control automatically the torque applied to the vehicle wheels (by the powertrain 129 and braking system 22) so as to maintain vehicle speed at the selected value. It is to be understood therefore that the LSP control system 12 is configured differently to the cruise control system 16, for which a wheel slip event has the effect of overriding the cruise control function so that manual operation of the vehicle must be resumed, or speed control by the cruise control system 16 resumed by pressing the resume button 173R or set-speed button 173.

The vehicle 100 is also provided with additional sensors (not shown) which are representative of a variety of different parameters associated with vehicle motion and status. These may be inertial systems unique to the LSP or HDC control systems 12, 12HD or part of an occupant restraint system or any other sub-system which may provide data from sensors such as gyros and/or accelerometers that may be indicative of vehicle body movement and may provide a useful input to the LSP and/or HDC control systems 12, 12HD. The signals from the sensors provide, or are used to calculate, a plurality of driving condition indicators (also referred to as terrain indicators) which are indicative of the nature of the terrain conditions over which the vehicle 100 is travelling.

The sensors (not shown) on the vehicle 100 include, but are not limited to, sensors which provide continuous sensor outputs to the VCU 10, including wheel speed sensors, as mentioned previously, an ambient temperature sensor, an atmospheric pressure sensor, tyre pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor which may be part of the SCS 14, a brake pedal position sensor, a brake pressure sensor, an accelerator pedal position sensor, longitudinal, lateral and vertical motion sensors, and water detection sensors forming part of a vehicle wading assistance system (not shown). In other embodiments, only a selection of the aforementioned sensors may be used.

The VCU 10 also receives a signal from the steering controller 170C. The steering controller 170C is in the form of an electronic power assisted steering unit (ePAS unit) 170C. The steering controller 170C provides a signal to the VCU 10 indicative of the steering force being applied to steerable road wheels 111, 112 of the vehicle 100. This force corresponds to that applied by a user to the steering wheel 171 in combination with steering force generated by the ePAS unit 170C. The ePAS unit 170C also provides a signal indicative of steering wheel rotational position or angle.

In the present embodiment, the VCU 10 evaluates the various sensor inputs to determine the probability that each of the plurality of different TR modes (control modes or driving modes) for the vehicle subsystems is appropriate, with each control mode corresponding to a particular terrain type over which the vehicle is travelling (for example, mud and ruts, sand, grass/gravel/snow) as described above.

If the user has selected operation of the vehicle in the automatic driving mode selection condition, the VCU 10 then selects the most appropriate one of the control modes and is configured automatically to control the subsystems according to the selected mode. This aspect of the invention is described in further detail in our co-pending patent applications GB2492748, GB2492655 and GB2499279, the contents of each of which is incorporated herein by reference as noted above.

As indicated above, the nature of the terrain over which the vehicle is travelling (as determined by reference to the selected control mode) may also be utilised in the LSP control system 12 to determine an appropriate increase or decrease in vehicle speed. For example, if the user selects a value of user_set-speed that is not suitable for the nature of the terrain over which the vehicle is travelling, the system 12 is operable to automatically adjust the value of LSP_set-speed to a value lower than user_set-speed. In some cases, for example, the user selected speed may not be achievable or appropriate over certain terrain types, particularly in the case of uneven or rough surfaces. If the system 12 selects a set-speed (a value of LSP_set-speed) that differs from the user-selected set-speed user_set-speed, a visual indication of the speed constraint is provided to the user via the LSP HMI 20 to indicate that an alternative speed has been adopted. The value of LSP_set-speed to which the control system is controlling the vehicle speed is stored in a memory of, or associated with, the speed controller.

Other arrangements may be useful.

In the present embodiment, the VCU 10 is configured to detect the presence of a crest in a predicted path of the vehicle 100 ahead of the vehicle 100 based at least in part on 3D terrain information captured by the vehicle 100 as described further below. The VCU 10 calculates a distance of the crest from the vehicle 100 as the vehicle 100 approaches the crest, and a width of the crest. The VCU 10 also determines whether the crest line is an 'uphill' crest line, being a crest line that the vehicle 100 will approach from below, travelling uphill, or a 'downhill' crest line being a crest line that will be approached by the vehicle whilst travelling with a substantially level attitude or a nose-lowered attitude (i.e. with the vehicle 100 travelling downhill). It is to be understood that if the vehicle 100 approaches the crest line from below, i.e. whilst travelling uphill, it may be important to ensure that the vehicle 100 has sufficient momentum as it travels uphill to complete the ascent and negotiate the crest.

In the present embodiment, the vehicle 100 is provided with a stereoscopic camera system 185C configured to generate stereo colour image pairs by means of a pair of forward-facing colour video cameras comprised by the system 185C. A stream of dual video image data is fed from the cameras to a processing unit 19 (or processing portion 19) that processes the image data received and repeatedly generates a 3D point cloud data set based on the images received. Techniques for generating 3D point cloud data sets based on stereoscopic image data are well known. Each point in the 3D point cloud data set corresponds to a 3D coordinate of a point on a surface of terrain ahead of the vehicle 100 viewed by each of the forward-facing video cameras of the stereoscopic camera system 185C.

It is to be understood that, in some embodiments, non-colour, grey-scale (black and white) cameras may be employed instead of colour cameras. Furthermore, in some further embodiments a different camera arrangement such as structured light cameras or a monocular camera with SFM (structure from motion) may be employed instead of a stereoscopic camera system in order to generate a 3D point cloud. In some alternative embodiments a sensor system other than a camera system may be employed, such as a LIDAR (Light Detection And Ranging) or scanning laser system.

In the present embodiment the 3D point cloud dataset is transformed such that the origin of the frame of reference of the dataset is the midpoint of a line joining the points at which the two front wheels 111, 112 of the vehicle 100 touch the ground over which the vehicle 100 is driving (also referred to herein as contact points or patches). In the present embodiment the frame of reference is defined with respect to Cartesian coordinates X, Y, Z where X is an axis transverse to the direction of vehicle travel, i.e. along a lateral direction with respect to the vehicle 100, Y is an axis oriented in an upward direction with respect to the vehicle 100, corresponding to a substantially vertically upward direction when the vehicle 100 is parked on level ground, and Z is parallel to or coincident with a longitudinal axis of the vehicle 100, along the direction of travel of the vehicle 100.

The processing unit 19 also receives data indicative of steering angle from the ePAS unit 170C via signal line 170L and takes this data into account in determining the predicted path.

FIG. 5(a) is a schematic representation of an image of terrain ahead of the vehicle 100 as captured by one of the two cameras of the camera system 185C. Superimposed on the image is a centreline of a predicted path PP of the vehicle 100 over the terrain as determined by the processing unit 19. In the example shown, steering wheel 171 of the vehicle 100 is centred, i.e. in the 'straight ahead' position, and the processing unit 19 has determined that the predicted path PP is in a straight line directly ahead of the vehicle 100.

Figure 5B:
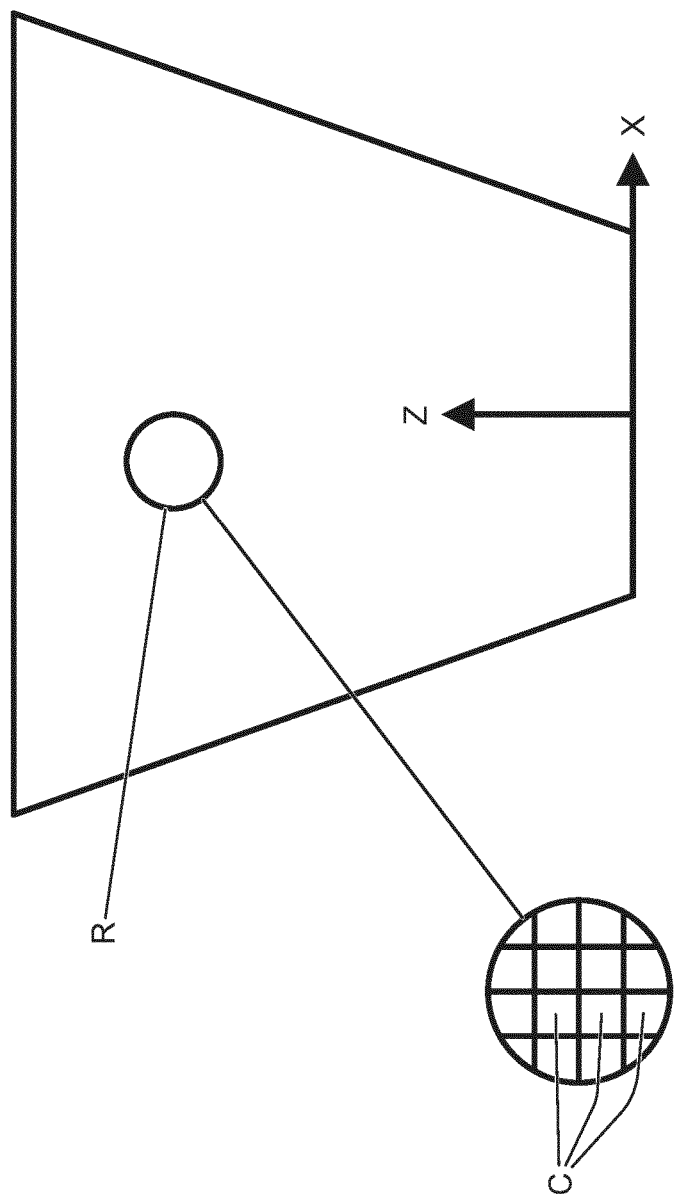
FIG. 5 is a schematic illustration of (a) a view of terrain ahead of the vehicle as captured by a stereoscopic camera system showing a predicted path of the vehicle, and (b) a plan view of an elevation map of the terrain generated from stereoscopic image data.

The processing unit 19 is configured to compute a terrain elevation map populated by data points of the point cloud dataset. FIG. 5(b) is a schematic illustration in plan view of an elevation map of terrain ahead of the vehicle 100. In the present embodiment the elevation map is generated with respect to the vehicle axes X, Y, Z (i.e. in the vehicle frame of reference). Following the MLS (multi-level surface) map methodology, the elevation map is notionally considered to be composed of square cells C in the X-Z plane of predetermined size as illustrated schematically in FIG. 5(b) (see inset). In the present embodiment the cells are of side 0.25 m although other sizes may be useful in some embodiments.

In the present embodiment, each 3D point of the elevation map is assigned to a cell C according to its position with respect to the X-Z plane. A given cell may contain points that are at multiple levels or heights, i.e. having different values of Y coordinate. The points within a given cell are grouped into one or more respective 'patches' according to the value of the Y coordinate, points having a Y coordinate within a given predetermined range of values of the Y coordinate being assigned to a patch corresponding to that range of values of Y coordinate. Thus, for example, points within a given patch are substantially coplanar, the plane defined by those points being substantially parallel to the X-Z plane. In contrast, points within the same cell that correspond to a bridge passing over the driving surface would not form part of the same patch as points falling on the driving surface. It is to be understood that each point in a given patch contains information regarding the geometry of the points falling within that patch.

It is to be understood that data structures other than MLS maps may be employed, for example Voxel maps may also be used, the purpose of the map being to reduce the number of data points.

The processing unit 19 analyses the cells and a cell is labelled as an 'obstacle' cell if the variance and range of the datapoints in the lowest patch of the cell exceed respective predetermined threshold values. In some alternative embodiments, mean height may be employed instead. In some embodiments, height difference (mean height) between a current cell and neighbouring cells may be used to detect obstacles, i.e. relatively large steps in height between neighbouring cells may indicate the presence of an obstacle. Cells not labelled as obstacle cells may be labelled as a 'horizontal patch'. If a cell does not contain any points it may be labelled an 'empty patch'.

In addition to implementing the MLS methodology as described above, the elevation map is refined such that overhanging patches falsely labelled as horizontal patches are discarded. An overhanging patch is a patch that is at a different height to a corresponding lower patch of the same cell consistent with the presence of an object that overhangs the surface over which the vehicle 100 is driving such as a branch of a tree or bridge that the vehicle 100 is passing underneath.

The processing unit 19 is configured to identify cells C along the predicted path of the vehicle 100 (the predicted path having a width substantially equal to the width W of the vehicle 100, centred on centreline PP) that are empty. The processing unit 19 does not take into account cells C labelled as obstacle cells or cells located behind obstacle cells that are occluded from view and referred to as 'obstacle shadow cells'. The processing unit 19 attempts to identify an area of connected empty cells where a width and area of the cells exceed respective predetermined threshold values of width and area. Such an area is considered to be a possible crest line area. By crest line is meant a furthermost part of the crest that is detectable in the 3D point cloud data, being assumed to be at or close to a summit of the crest.

It is to be understood that in some embodiments of the present invention the processing unit 19 is configured to identify crest lines in the 3D point cloud regardless of whether they are in the predicted path of the vehicle 100. It is to be understood that in some embodiments information in respect of the presence of crests may be used in determining the predicted path, or in planning a suitable path for the vehicle 100 over terrain. Accordingly, information in respect of crests, regardless of whether they are in the predicted path, can be helpful.

The processing unit 19 also takes into account the angle of the slope of terrain over a predetermined distance immediately prior to a possible crest line, in the present embodiment over a distance of 2 m prior to the possible crest line, in determining whether the crest line is an uphill crest line or a downhill crest line. In the present embodiment, a downhill crest line may be a crest line where a transition takes place from substantially level travel to downhill travel, or from a first downhill slope angle to a steeper downhill slope angle to the extent that there is no view of the slope of steeper angle from the camera point of view as the crest line is approached.

If, over a predetermined number of frames of point cloud data, the average slope angle over this distance exceeds a predetermined critical value, in the present embodiment an angle of 7 degrees, and the width and area of a group of empty cells in the predicted path exceed the respective threshold values, the processing unit 19 determines that the vehicle 100 is approaching an uphill crest line.

In contrast if, over a predetermined number of frames of point cloud data, the average slope angle over this distance is less than or equal to the predetermined critical value, and the width and area of a group of empty cells in the predicted path exceed the respective threshold values, the processing unit 19 determines that the vehicle 100 is approaching a downhill crest line.

The processing unit 19 identifies the crest line as being a boundary between the empty cells and terrain in front of the empty cells and repeatedly calculates the distance CD of the crest line from the vehicle 100.

In some embodiments, the critical slope angle is an angle other than 7 degrees, preferably an angle in the range from 5 degrees to 10 degrees.

It is to be understood that values of predetermined distance other than 2 m may be used in some embodiments, with distances in the range from 2 m to 5 m being considered advantageous.

In some embodiments the distance CD of the crest line from the vehicle 100 and a width CW of the crest line may be displayed to the driver, for example via instrument cluster 195. The average slope angle may be displayed in addition or instead in some embodiments.

In the present embodiment the predetermined number of frames of point cloud data noted above over which certain conditions must be met in order to allow the VCU 10 to determine that a crest is present is four, but other values may be useful in some embodiments. Thus, if the width and area of a group of empty cells in the predicted path exceed the respective threshold values, over at least four frames of point cloud data, the VCU 10 determines that the vehicle 100 is approaching a crest line. In addition, the condition that at least a portion of the crest spans the centreline of the predicted path by at least half the vehicle width on one or both sides thereof may be used as a determining factor.

The processing unit 19 is configured to calculate a value of gradient (slope) of the predicted path in order to determine an average value of slope over the predetermined distance leading to the crest line. In the present embodiment, cells labelled as obstacle cells are not employed in the calculation of slope. Furthermore, cells that are behind obstacles and which would be occluded from camera view ('obstacle shadows' or 'shadow cells') are also disregarded. This is because they may interfere with correct slope calculation.

Slope value is calculated from the predicted path by using only those cells with confidence value greater than a specified threshold. Cells which are marked as obstacles and empty are not considered for the slope calculation. Confidence values are discussed further below.

The processing unit 19 then determines the cells ahead of the vehicle 100 through which front tyres of the vehicle 100 are predicted to pass, i.e. cells through which the predicted tracks PL, PR of the left and right front wheels 111, 112 will likely pass including cells labelled as obstacle cells. The processing unit 19 employs a known value of track length T of the vehicle 100 (i.e. the distance between the centres of wheels of a given axle, which is lower than the vehicle overall width, W of the vehicle 100) in order to determine the predicted tracks PL, PR.

The processing unit 19 calculates a mean height value of terrain datapoints in each grid cell C excluding datapoints in overhanging patches falsely labelled as horizontal patches as noted above. The processing unit 19 defines a 3D grid of mean height datapoints, each mean height datapoint being located at the centre of each cell C as viewed along the Y axis, and of a height substantially equal to the mean height value of terrain datapoints of that cell C as described above.

The processing unit 19 then calculates the gradient of the terrain over which the vehicle will travel. This may be effected in one of a number of ways.

In a first example embodiment the processing unit 19 first determines the path that the vehicle will travel and then calculates the gradient of each individual cell lying on one of the predicted wheel tracks. For each cell lying on one of the predicted wheel tracks PL, PR, the processing unit 19 fits a line to the mean height datapoints of a group of one or more adjacent cells including the subject cell and calculates a value of a 'raw slope angle', being an angle between the fitted line and the forward direction of travel of the vehicle 100 (Z-direction), along the vehicle 100, at the moment the point cloud data was captured. In particular, starting from the cell (the target or subject cell) for which the processing unit 19 is calculating the slope, the datapoints in one or more adjacent cells in front of and behind the target cell, are employed to calculate slope. This may be done in one of two ways.

The datapoints in one or more adjacent cells in front of and behind the target cell may be taken with respect to the instant z-axis of the vehicle 100 when the point cloud data was captured (which may not be parallel to the direction of travel of the vehicle 100 when it travels through the subject cell), and a best fit line applied to these datapoints. The angle between this best fit line and the instant forward direction of travel at the moment the point cloud data was captured is calculated. This angle may be considered to be the gradient of the driving surface associated with this cell.

Alternatively the datapoints in one or more adjacent cells in front of and behind the target cell on the predicted path of the vehicle (which will be substantially parallel to the direction of travel of the vehicle 100 when it travels through the subject cell) may be employed, and a best fit line applied to these datapoints. The angle between this best fit line and the instant forward direction of travel at the moment the point cloud data was captured is calculated. This angle may be considered to be the gradient of the driving surface associated with this cell.

In this manner a gradient associated with each cell on the predicted path for each of the wheels is determined.

In the present embodiment the processing unit 19 calculates a gradient value employing mean height datapoints of the grid of mean height datapoints of the three successive cells ahead of the target cell, in a line along the predicted path, and mean height datapoints of the three successive cells behind the target cell, in a line along the predicted path, with respect to the instant z-axis of the vehicle 100 when the point cloud data was captured, although it will be appreciated that other numbers of adjacent cells may be used.

In some alternative example embodiments, the processing unit 19 calculates a relative gradient value for each cell C of the point cloud dataset, for example employing mean height datapoints in the three cells ahead of the target cell and mean height datapoints in the three cells behind the target cell as described above, with respect to the instant z-axis of the vehicle 100 when the point cloud data was captured. The processing unit 19 then extracts gradient values in respect of cells along the predicted tracks PL, PR, for example by overlaying the predicted tracks PL, PR on the grid cells to determine over which grid cells the predicted tracks will pass, in order to determine a gradient of terrain over which the vehicle 100 is predicted to pass. The processing unit 19 can then calculate an average gradient of terrain over the predetermined distance leading to the crest line.

The processing unit 19 converts the relative gradient for each cell C along the predicted tracks PL, PR to an absolute slope angle (being slope angle relative to an earth reference frame) taking into account the orientation of the vehicle 100 at a given moment in time. It is to be understood that the processing unit 19 obtains information indicative of vehicle orientation with respect to an earth reference frame Xe, Ye, Ze (where Xe is a horizontal axis through the midpoint of a notional line joining the contact patches of the front wheels 111, 112 of the vehicle 100, and is a projection of the vehicle X-axis onto a horizontal plane through the midpoint of the notional line, Ye is a vertical axis through the midpoint of the notional line and Ze is a horizontal axis through the midpoint, orthogonal to the Xe and Ye axes) from an inertial measuring (or measurement) unit (IMU) 23 that generates a signal indicative of vehicle orientation with respect to the Xe, Ye, Ze axes. A value of absolute slope angle is calculated for each cell C. The cells C through which front wheels 111, 112 of the vehicle 100 are predicted to pass, based on the predicted tracks PL, PR, are then determined.

Associated with the absolute slope value calculated for each cell C is a confidence level of the value. The processing unit 19 determines the maximum value of absolute slope of all cells C along the predicted path that have a confidence level greater than a threshold value.

A confidence value for each cell is found by taking the mean of the density of points in all the four neighbouring cells sharing an edge with the subject cell. It takes into consideration only the non-empty cells for confidence calculation.

It is to be understood that by cell density is meant the number of valid/available measurements (3D points) in each cell. If the number of measurements (3D points) is below a threshold value, the cell is considered to be empty/invalid. In the present embodiment the threshold value is 10, but other values may be useful in some embodiments. Provided the number of measurements exceeds the threshold value the cell is represented as corresponding to a region of terrain having a mean height value that is the mean of all the 3D points within the cell.

In the present embodiment, the confidence value is calculated by taking the mean of the point density of the non-empty cells neighbouring the subject cell. Thus, if the point densities of the neighbouring cells are 40, 50, 60 and 50 points/cell respectively, the mean density based on neighbouring cells is (40+50+60+50)/4=50.

A confidence value for each of the left and right tyre predicted paths PL, PR is found by taking the minimum confidence value of the three successive cells over which the predicted path has the maximum slope. The confidence value for the predicted path is taken as the confidence value of the path (left or right) with maximum slope value.

If, in a given frame of data, the difference between slope values for corresponding left and right predicted tracks PL, PR at any location along the predicted tracks PL, PR exceeds a threshold difference value, the slope values calculated are determined to be spurious and are ignored. In this case, the processing unit 19 employs the slope values obtained from the most recently acquired frame for which the difference between slope values of respective tracks PL, PR did not exceed the threshold difference value, i.e. for which the slope values were not considered to be spurious, in calculating the slope of the predicted path. Furthermore, the processing unit 19 compares the maximum value of absolute slope determined for the current given frame with the corresponding maximum values obtained for the three previous frames for which the slope values were not considered to be spurious. If the maximum value of absolute slope determined for the current given frame is not consistent with those of these previous three frames, the processing unit 19 ignores the slope values for the present frame and employs the maximum value of absolute slope determined for the previous frame for which the slope values were not spurious as the prevailing predicted maximum value of absolute slope.

The processing unit 19 then determines whether the crest line is an uphill or downhill crest line based on the average slope of the terrain over the distance of 2 m immediately prior to the crest line. The processing unit 19 takes the average value of the slope of the left and right wheel tracks over the 2 m distance; if the slope exceeds 7 degrees and the number of empty cells meets the criterion described above for crest detection the processing unit 19 determines the crest line is an uphill crest line. If the slope is less than or substantially equal to 7 degrees, and the number of empty cells meets the criterion described above for crest detection, the processing unit 19 determines the crest line is a downhill crest line.

Output to the LSP Control System

In the present embodiment, the processor 19 outputs the value of distance CD of the crest line from the vehicle 100 and information indicative of whether the crest line is an uphill crest line or a downhill crest line to the LSP control system 12 via signal 12S.

If the information received by the LSP control system 12 indicates that a downhill crest line has been detected, the LSP control system 12 determines whether the current value of LSP_set-speed that the LSP control system 12 is endeavouring to cause the vehicle to maintain is greater than a downhill crest line maximum speed value. The downhill crest line maximum speed value is a maximum permitted speed value of the vehicle as it passes over a downhill crest line.

Provided the downhill crest line maximum speed value is less than the value of LSP_set-speed, the LSP control system 12 is configured to cause the vehicle to slow as it approaches the downhill crest line such that the speed of the vehicle is substantially equal to the downhill crest line maximum speed value 12 at a predetermined speed location that is a predetermined speed distance SD before the vehicle 100 reaches the downhill crest line. Thus the LSP control system 12 gradually reduces the vehicle speed as it approaches the predetermined speed location so that a composed speed change can be effected. By achieving the required downhill crest line maximum speed value prior to arriving at the crest line the driver obtains a feeling of confidence in the performance of the speed control system as the vehicle will not still be braking right up to the crest line.

In contrast, if the information received by the LSP control system 12 indicates that an uphill crest line has been detected, the LSP control system 12 determines whether the current value of LSP_set-speed that the LSP control system 12 is endeavouring to cause the vehicle 100 to maintain is greater than an uphill crest line maximum speed value. The uphill crest line maximum speed value is a maximum permitted speed value of the vehicle as it passes over an uphill crest line. Provided the uphill crest line maximum speed value is less than the value of LSP_set-speed, the LSP control system 12 is configured to cause the vehicle to slow as it approaches the crest line such that the speed of the vehicle is substantially equal to the uphill crest line maximum speed value 12 as it reaches the uphill crest line. In this manner positive torque is applied to the wheels for a longer period of time before speed is reduced towards the uphill crest line maximum speed value. Slowing the vehicle so that it is at its cresting speed prior to reaching the crest will result in a reduction in momentum prior to reaching the crest that may be detrimental to the vehicle's ability to reach the crest line, in particular in soft or low friction surfaces such as sand or mud. Furthermore, as the vehicle is travelling uphill momentum can be more easily lost so later slowing of the vehicle is less likely to affect the speed reduction being timely effected.

The downhill crest line maximum speed value and the uphill crest line maximum speed value may both be referred to as a predetermined crest speed.

In the present embodiment, the uphill crest line maximum speed value is set to a value of substantially 6 kph, the downhill crest line maximum speed value is set to a value of substantially 3.6 kph. It is to be understood that other values may be useful in some embodiments. In some embodiments the value of one or more of the uphill crest line maximum speed value and downhill crest line maximum speed value may be dependent at least in part on the driving mode in which the vehicle is operating. In some embodiments, the uphill crest line maximum speed value may be higher for driving modes adapted for relatively slippery or high drag surfaces in order to increase the likelihood of a vehicle continuing to make adequate progress over terrain compared with driving modes adapted for less slippery, low drag surfaces. The downhill crest line maximum speed value may be lower for driving modes adapted for relatively slippery surfaces compared with driving modes adapted for less slippery surfaces due to potentially increased stopping distances on relatively slippery surfaces.

Figure 6:
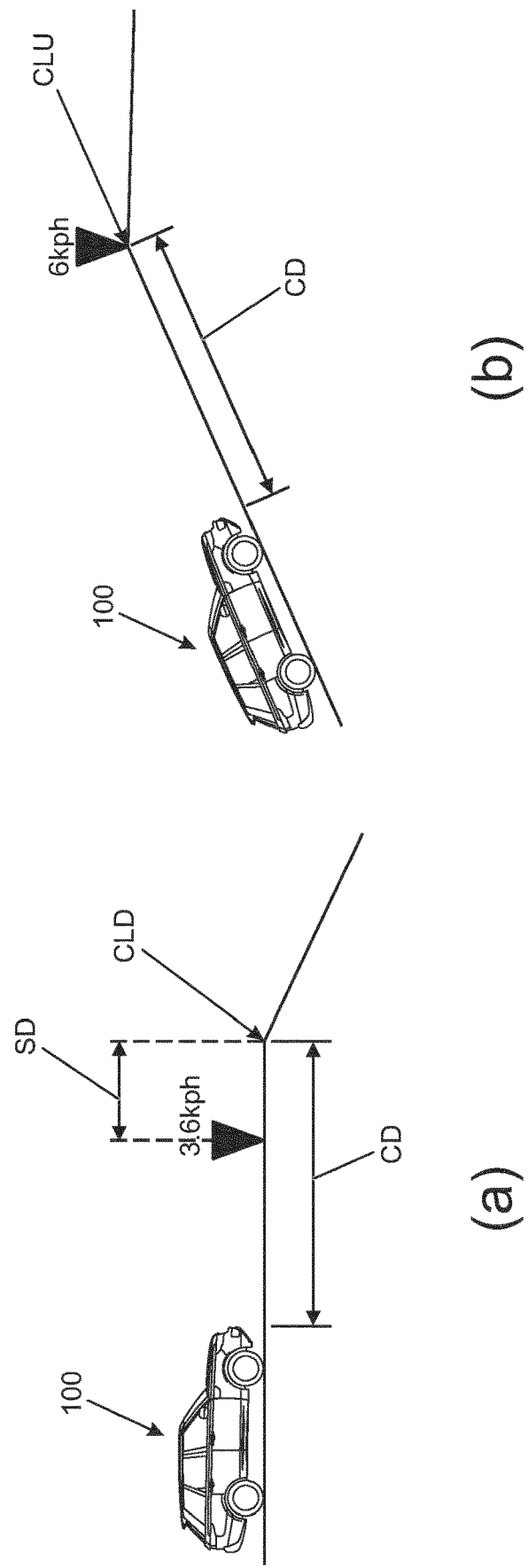
FIG. 6 illustrates scenarios in which (a) the vehicle of the embodiment of FIG. 1 is approaching a downhill crest and (b) the vehicle of the embodiment of FIG. 1 is approaching an uphill crest.

FIG. 6(a) illustrates a vehicle 100 according to the present embodiment approaching a downhill crest line CLD under the control of the LSP control system 12 with LSP_set-speed set to a value exceeding 3.6 kph. In the scenario shown, the LSP control system 12 calculates a value of distance known as the speed distance value SD and controls vehicle speed such that, when the vehicle reaches a speed distance SD from the downhill crest line CLD the speed is substantially equal to 3.6 kph. Thus, the LSP control system 12 endeavours to ensure that vehicle speed has fallen to the downhill crest line maximum speed value prior to reaching the downhill crest line CLD. Calculation of the speed distance value SD will be described below.

FIG. 6(b) illustrates a vehicle 100 ascending a slope and approaching an uphill crest line CLU. Again, the vehicle 100 is travelling under the control of the LSP control system 12 with the value of LSP_set-speed set to a value greater than 6 kph. The LSP control system 12 receives information from the processing unit 19 indicating that the vehicle 100 is approaching an uphill crest line CLU and controls vehicle speed such that is falls to substantially 6 kph substantially at the location of the uphill crest line CLU and not before.

In the present embodiment, the LSP control system 12 is configured to commence slowing the vehicle to the uphill crest line maximum speed value or downhill maximum speed value, if the value of LSP_set-speed is greater than the relevant crest line maximum speed value, at a time interval (or period) before the vehicle arrives at the location at which the relevant crest line maximum speed value must be achieved. This time period may be a set time period of, for example three seconds. The time period is converted into a control distance for a comparison to the measured distance to the crest line CD that is substantially equal to the distance travelled by the vehicle in a period of three seconds at a value of speed equal to the prevailing value of LSP_set-speed. Thus, the control distance is given by the formula:

Control Distance=3×LSP_set-speed

Thus, if the LSP control system 12 is causing the vehicle 100 to travel at the maximum allowable value of LSP_set-speed of 30 kph (8 ms$^{-1}$), the control distance would be Control Distance=3×8 m=24 m Thus if the value of LSP_set-speed was set to 30 kph, the LSP control system 12 would commence causing vehicle speed to fall to the relevant crest line maximum speed value (6 kph or 3.6 kph) when the vehicle 100 is 24 m from the crest (where an uphill crest line has been detected) or a distance of substantially 24 m before a location that is itself a predetermined speed distance SD (in the present embodiment 2 m) before the crest (where a downhill crest line has been detected). In the present embodiment the camera system 185C is capable of capturing images of a driving surface at least 30 m ahead of the vehicle 100 when travelling over substantially flat, level ground. The processing unit 19 is in turn capable of generating 3D point cloud data from the captured data in respect of terrain at least 30 m ahead of the vehicle 100.

It will be appreciated that the value of 3 seconds given above is exemplary only and different time periods may be used without diverting from the scope of the invention. In particular it will be noted that due to the assistance of gravity in slowing the vehicle the time period may be reduced when an uphill crest is detected, optionally the magnitude of the reduction may be dependent on the detected gradient of the slope prior to the crest, for example the time period (and therefore control distance) may reduce as the gradient increases. The time period (and therefore control distance) may also be varied depending on the terrain over which the vehicle is travelling. For example when travelling uphill on a high drag surface the time period may be reduced as the combined effects of surface drag and gravity will enable greater deceleration and later speed reduction will maintain momentum for longer.

The surface drag may be taken into account either by way of setting the control distance based on a current terrain mode (the selection of that terrain mode in itself taking into account the rolling resistance, or drag, of the driving surface), or directly in dependence on a determined amount of rolling resistance. Rolling resistance can for example be determined by comparing an actual acceleration or speed against an expected acceleration or speed for a given power train output. In this case, the control distance can be varied independently of terrain mode, or even implemented in vehicles which lack a terrain mode.

In some embodiments, the processing unit 19 outputs the value of distance CD of the crest line from the vehicle 100 to the LSP control system 12 via signal 12S and the LSP control system 12 determines whether the crest line is an uphill crest line or a downhill crest line by reference to a current value of pitch angle of the vehicle 100 with respect to a horizontal plane, instead of terrain slope data ahead of the crest line as determined by the processing unit 19. Pitch information is received by the LSP control system 12 from an inertial measurement unit (IMU) 23. In some embodiments employing current pitch angle to determine whether the crest line is an uphill or downhill crest line, then if the pitch angle exceeds the critical angle of 7 degrees above a horizontal reference plane, the LSP control system 12 determines that the upcoming crest line is an uphill crest line. If the pitch angle does not exceed 7 degrees the LSP control system determines that the upcoming crest line is a downhill crest line. Other values of critical angle may be useful in some embodiments.

FIG. 7 illustrates the manner in which the detection of a crest ahead of the vehicle 100 is made in the present embodiment.

At step S101 the processing unit 19 receives a stream of image data from the stereoscopic camera system 185C.

At step S103 the processing unit 19 calculates the 3D point cloud dataset based on the most recently received stereoscopic image pair comprised by the stream of image data. In some embodiments, averaging of one or more respective left and right image frames may be performed in order to generate a 'smoothed' respective left and right image frame, reducing image noise. Other noise reduction techniques may be applied in addition or instead.

At step S105 the point cloud dataset is transformed by the processing unit 19 to the vehicle reference frame X, Y, Z from the reference frame of the camera system 185C. In the present embodiment, the camera system 185C is mounted in an upper region of a windscreen of the vehicle 100.

At step S107 the processing unit 19 generates an elevation map with respect to the vehicle frame of reference.

At step S109 the processing unit 19 divides the elevation map into cells and groups datapoints in each cell into one or more patches.

At step S111 the processing unit 19 identifies any patches of each cell that correspond to objects overhanging the predicted path and ignores these patches for subsequent calculations in respect of the presence of a slope. The processing unit also identifies cells having less than a threshold number of datapoints, and ignores these cells for calculations of terrain slope. In the present embodiment the threshold number of datapoints is ten as noted above although other values may be useful in some alternative embodiments.

At step S113 the processing unit 19 identifies obstacle shells and shadow cells corresponding to the obstacle cells in the elevation map, and ignores these for subsequent calculations in respect of the presence of a crest.

At step S115 the processing unit 19 determines a predicted path PP of the vehicle 100 based on steering wheel angle. If the steering wheel is oriented in the substantially straight ahead direction the processing unit 19 assumes the predicted path is substantially straight ahead of the vehicle 100. If the steering wheel is not oriented in the straight ahead direction the VCU 10 assumes the predicted path PP is of a curvature corresponding to steering wheel angle, in the direction of turn of the steering wheel.

At step S117 the processing unit 19 identifies empty cells in an area ahead of the vehicle 100 having at least a portion of width at least equal to half the vehicle width W located either side of the predicted path PP. A boundary between the empty cells and non-empty cells may be considered to represent a discontinuity. The processing unit 19 then identifies a crest line corresponding to terrain on the predicted path immediately before the empty cells with respect to an observer located in the vehicle 100. The processing unit 19 then calculates an average value of absolute slope angle of the terrain over which each of the left and right wheel tracks pass over a predetermined distance immediately prior to the crest line, in the present embodiment a distance of 2 m. By absolute slope angle is meant the angle of the terrain relative to a plane that is horizontal with respect to an 'earth' frame of reference. The processing unit 19 then calculates the average slope angle of the left and right wheel tracks.

At step S119 the processing unit determines whether the crest line ahead is an uphill crest line or a downhill crest line. As noted above, if the slope exceeds 7 degrees and the number of empty cells meets the criterion described above for crest detection the processing unit 19 determines the crest line is an uphill crest line and proceeds to step S121.

If the slope is less than or substantially equal to 7 degrees, and the number of empty cells meets the criterion described above for crest detection, the processing unit 19 determines the crest line is a downhill crest line and proceeds to step S123. As noted herein, other predetermined values of angle in the range from around 5 degrees to around 15 degrees may be useful in some embodiments.

At step S121 the processing unit 19 calculates a value of the control distance and if LSP_set-speed is greater than the uphill crest line maximum speed value (6 kph in the present embodiment) the LSP control system 12 is caused, when the vehicle 100 reaches the control location, to begin reducing vehicle speed to the crest line maximum speed value. The LSP control system 12 is caused to reduce vehicle such that it does not fall to a value of substantially the crest line maximum speed value before reaching the crest line.

As noted above, if, alternatively, a downhill crest line has been detected, and the value of LSP_set-speed is greater than the downhill crest line maximum speed value (3.6 kph in the present embodiment), then at step S123 the processing unit 19 calculates a value of the control distance. When the vehicle 100 reaches the control location, being a distance ahead of the speed location of substantially the control distance, the LSP control system 12 is caused to begin reducing vehicle speed such that it reaches the downhill crest line maximum speed value when the vehicle 100 reaches the speed location, being the location a distance ahead of the downhill crest line substantially equal to the speed distance. The LSP control system 12 is caused to reduce vehicle speed such that it falls to a value of substantially the downhill crest line maximum speed value substantially at the speed location and not before. The LSP control system 12 then attempts to cause the vehicle speed to remain substantially equal to the downhill crest line maximum speed value until the vehicle 100 reaches the crest line.

Some embodiments of the present invention enable vehicle operation with enhanced composure when traversing terrain. This is at least in part due to a reduction in driver workload when operating with the LSP control system 12 active. This is because a driver is not required manually to decrease the value of user_set-speed in order to reduce vehicle speed when approaching a crest. Rather, the VCU 10 anticipates that the vehicle 100 will traverse a crest and causes a reduction in vehicle speed accordingly.

It is to be understood that the presence of a crest, in particular a crest following a steep uphill incline, may mean that as the vehicle 100 passes over the crest, a blind spot will exist ahead of the vehicle 100 due to the presence of the bonnet (or 'hood') of the vehicle 100, blocking the view of a driver ahead of the vehicle 100. The blind spot may correspond to a distance ahead of the vehicle 100 of up to 4 m or more. The processing unit 19 causes a speed of the vehicle 100 to not exceed a predetermined speed value (the uphill or downhill crest line maximum speed value) as the vehicle 100 passes over the crest, the predetermined speed value being a relatively low value in order to allow a driver time to assess terrain ahead of the vehicle 100 and plan a route forward over the terrain avoiding any obstacles whilst still attempting to ensure that progress of the vehicle 100 over difficult terrain is maintained. The processing unit 19 does this by setting the value of LSP_set-speed_max to a predetermined value (the uphill or downhill crest line maximum speed value) that may be dependent on TR mode, vehicle speed prior to detecting the presence of the crest, and/or one or more other parameters, in particular the average slope prior to the crest. In some embodiments, if the speed of the vehicle 100 is already at or below the relevant the crest line maximum speed value when the presence of a crest is detected, the LSP control system 12 may cause the vehicle 100 to continue travelling at substantially the same speed. However, if it is determined that the current speed is greater than the relevant the crest line maximum speed value, then the LSP control system 12 sets parameter LSP_set-speed is to the relevant crest line maximum speed value. Other arrangements may be useful in some embodiments.

It is to be understood that wheel speed sensors configured to sense the speed of rotation of wheels of the vehicle 100, may be useful in monitoring progress of the vehicle 100 over terrain. Furthermore, the IMU 23 may be employed to determine when the vehicle 100 begins to negotiate a crest, at least in part by reference to a change in pitch attitude of the vehicle 100 as the vehicle crests.

In some embodiments, when a vehicle 100 is negotiating a crest ahead of the vehicle 100 the VCU 10 may cause vehicle speed to be limited to the respective uphill or downhill crest line maximum speed value until the stereoscopic camera system 185C has acquired 3D point cloud data for the terrain previously hidden by the crest line and determined a new value of LSP_set-speed_max based on the new sensed data. That is, as the vehicle 100 travels over the crest the VCU 10 may cause the LSP control system 12 to limit LSP_set-speed to a relatively low speed until 3D point cloud data has been gathered for the previously hidden landscape and a new value of LSP_set-speed_max has been set based on that data.

Once the vehicle 100 has negotiated the crest line CLU, CLD, the LSP control system 12 may resume causing the vehicle 100 to travel at the prevailing value of LSP_set-speed, which may be lower than the value of user_set-speed as discussed above if the user selects a value of user_set-speed that is not suitable for the nature of the terrain over which the vehicle is travelling.

It will be understood that the embodiments described above are given by way of example only and are not intended to limit the invention, the scope of which is defined in the appended claims.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A speed control system for a vehicle, the speed control system being configured to:
   automatically cause application of positive and negative torque, as required, to one or more wheels of the vehicle to cause the vehicle to travel in accordance with a target speed value, the target speed value being stored in a memory of the speed control system; and
   detect a crest of a slope in front of the vehicle;
   wherein the speed control system is configured automatically to:
   attempt to adjust a speed of the vehicle to cause the vehicle to travel at a predetermined crest speed value when the crest of the slope is detected in front of the vehicle, the predetermined crest speed value being determined based at least in part on terrain gradient information in respect of terrain prior to the crest, the terrain gradient information comprising information indicative of a gradient of a driving surface in front of an instant location of the vehicle over a prescribed distance prior to the crest; and
   control the speed of the vehicle to achieve the predetermined crest speed value at a predetermined speed location with respect to the crest of the slope, the predetermined speed location being determined at least in part based on the gradient information in respect of terrain prior to the crest, wherein the predetermined speed location is a first, non-zero, speed distance prior to the crest, in dependence on the gradient information indicating that the driving surface is not inclined above a substantially horizontal plane by more than a first predetermined amount.

2. The speed control system according to claim 1 wherein the terrain gradient information comprises information indicative of the gradient of the driving surface substantially at the instant location of the vehicle.

3. The speed control system according to claim 1 wherein the predetermined crest speed value is set to a first crest speed value in dependence on the gradient information indicating that the driving surface over the prescribed distance prior to the crest is inclined above a substantially horizontal plane by more than a first predetermined amount.

4. The speed control system according to claim 3 wherein the predetermined crest speed value is set to a second crest speed value different from the first crest speed value in dependence on the gradient information indicating that the driving surface is not inclined above the substantially horizontal plane by more than the first predetermined amount.

5. The speed control system according to claim 4 wherein the first crest speed value is greater than the second crest speed value.

6. The speed control system according to claim 1 configured wherein the predetermined speed location is set to be a second speed distance from the crest in dependence on the gradient information indicating that the driving surface is inclined above a substantially horizontal plane by more than the first predetermined amount, wherein the second speed distance is substantially zero.

7. The speed control system according to claim 6 wherein the second speed distance is set to a second distance beyond the crest in dependence on the gradient information indicating that the driving surface is inclined above the substantially horizontal plane by more than the first predetermined amount.

8. The speed control system according to claim 6 configured to cause vehicle speed to begin to reduce to the predetermined crest speed value when the vehicle is at a predetermined control location, the predetermined control location being a predetermined control distance in front of the predetermined speed location.

9. The speed control system according to claim 8 wherein the predetermined control distance is calculated as the distance travelled by the vehicle at an instant target speed value in a predetermined time period.

10. The speed control system according to claim 8 wherein the predetermined control distance is calculated based at least in part on the gradient information in respect of the terrain prior to the crest.

11. The speed control system according to claim 10 wherein the predetermined control distance is arranged to decrease with increasing gradient of the terrain prior to the crest based on the gradient information.

12. The speed control system according to claim 10 wherein the predetermined control distance is arranged to increase with increasing downhill gradient of the terrain prior to the crest, based on the gradient information.

13. The speed control system according to claim 8 wherein the predetermined control distance is determined based at least in part on an identity of a selected one of a plurality of driving modes in which the vehicle is operating.

14. The speed control system according to claim 13 wherein in each of the plurality of driving modes at least one of a plurality of vehicle subsystems is caused to operate in a predetermined one of a plurality of configuration modes of that subsystem, the subsystem configuration mode being determined based on the selected driving mode, the vehicle subsystems including at least one of a powertrain subsystem, a brakes subsystem and a suspension subsystem.

15. The speed control system according to claim 13 wherein the driving modes include at least one mode adapted for driving over the high drag surfaces, wherein the predetermined control distance is arranged to be lower for control modes adapted for operation on the high drag surfaces relative to control modes adapted for operation on low drag surfaces, for a given driving surface topography.

16. The speed control system according to claim 1 comprised in the vehicle.

17. An electronic controller for controlling a speed of a vehicle, the controller comprising:
one or more electrical inputs for receiving: a signal providing information indicative of a target speed value; a signal indicative that a crest of a slope in front of the vehicle is detected; and a signal providing information indicative of terrain gradient in respect of terrain prior to the crest,
wherein the controller causes application of positive and/or negative torque to one or more wheels of the vehicle to:
cause the vehicle to travel in accordance with the target speed value;
adjust automatically the speed of the vehicle to a predetermined crest speed value when the crest of the slope in front of the vehicle is detected, wherein the predetermined crest speed value is determined based at least in part on the signal indicative of terrain gradient information in respect of terrain prior to the crest, the terrain gradient information comprising information indicative of the gradient of a driving surface prior to an instant location of the vehicle over a prescribed distance prior to the crest; and
control the speed of the vehicle to achieve the predetermined crest speed value at a predetermined speed location with respect to the crest of the slope, the predetermined speed location being determined at least in part based on the gradient information in respect of terrain prior to the crest, wherein the predetermined speed location is a first, non-zero, speed distance prior to the crest, in dependence on the gradient information indicating that the driving surface is not inclined above a substantially horizontal plane by more than a first predetermined amount.

18. A method of controlling a speed of a vehicle implemented by means of a control system, comprising:
automatically causing application of positive and negative torque, as required, to one or more wheels of the vehicle to cause the vehicle to travel in accordance with a target speed value, the target speed value being stored in a memory of the control system;
detecting a crest of a slope in front of the vehicle;
automatically attempting to adjust the speed of the vehicle to cause the vehicle to travel at a predetermined crest speed value when the crest of the slope in front of the vehicle is detected, the method comprising determining the predetermined crest speed value based at least in part on terrain gradient information in respect of terrain prior to the crest, the terrain gradient information comprising information indicative of the gradient of a driving surface prior to an instant location of the vehicle over a prescribed distance prior to the crest; and
controlling the speed of the vehicle to achieve the predetermined crest speed value at a predetermined speed location with respect to the crest of the slope, the predetermined speed location being determined at least in part based on the gradient information in respect of terrain prior to the crest, wherein the predetermined speed location is a first, non-zero, speed distance prior to the crest, in dependence on the gradient information indicating that the driving surface is not inclined above a substantially horizontal plane by more than a first predetermined amount.

* * * * *